United States Patent
Senzaki

(10) Patent No.: US 12,281,188 B2
(45) Date of Patent: *Apr. 22, 2025

(54) SURFACE TREATMENT LIQUID AND HYDROPHILIZING TREATMENT METHOD

(71) Applicant: TOKYO OHKA KOGYO CO., LTD., Kanagawa (JP)

(72) Inventor: Takahiro Senzaki, Kanagawa (JP)

(73) Assignee: TOKYO OHKA KOGYO CO., LTD., Kanagawa (JP)

( * ) Notice: Subject to any disclaimer, the term of this patent is extended or adjusted under 35 U.S.C. 154(b) by 561 days.

This patent is subject to a terminal disclaimer.

(21) Appl. No.: 17/675,607

(22) Filed: Feb. 18, 2022

(65) Prior Publication Data

US 2022/0269173 A1 Aug. 25, 2022

(30) Foreign Application Priority Data

Feb. 22, 2021 (JP) .................................. 2021-026381

(51) Int. Cl.
| | | |
|---|---|---|
| C08F 2/46 | (2006.01) | |
| C08F 2/50 | (2006.01) | |
| C08F 228/02 | (2006.01) | |
| C08G 61/04 | (2006.01) | |

(52) U.S. Cl.
CPC .................................. C08F 228/02 (2013.01)

(58) Field of Classification Search
CPC . C09D 5/00; C09D 4/00; C08F 228/02; C08F 230/085; C08F 226/04; C08F 226/06
USPC .................................................. 522/1; 520/1
See application file for complete search history.

(56) References Cited

U.S. PATENT DOCUMENTS

| | | | |
|---|---|---|---|
| 2022/0267495 A1* | 8/2022 | Senzaki | ................ C08F 226/02 |
| 2022/0269173 A1 | 8/2022 | Senzaki | |

FOREIGN PATENT DOCUMENTS

| | | | |
|---|---|---|---|
| CN | 108727937 | 11/2018 | |
| CN | 110437370 | 11/2019 | |
| JP | 2009-126948 | 6/2009 | |
| JP | 5437523 | 3/2014 | |
| JP | 2015-105312 | 6/2015 | |
| JP | 2016-3319 | 1/2016 | |
| JP | 2018-135312 | 8/2018 | |
| JP | 2019-6943 | 1/2019 | |
| JP | 2019-131626 | 8/2019 | |
| WO | 2015/010016 | 1/2015 | |
| WO | WO-2015002269 A1 * | 1/2015 | ............. B32B 27/08 |
| WO | 2018/230514 | 12/2018 | |

OTHER PUBLICATIONS

Ishizaki et al, WO 2015002269 Machine Translation, Jan. 8, 2015 (Year: 2015).*
Office Action issued Oct. 23, 2023 in U.S. Appl. No. 17/678,350.
Office Action issued Jun. 11, 2024 in U.S. Appl. No. 17/678,350.
International Search Report issued Jan. 26, 2021 in International (PCT) Application No. PCT/JP2020/043995.
Office Action issued Sep. 30, 2024 in U.S. Appl. No. 17/787,744.

* cited by examiner

*Primary Examiner* — Jessica Whiteley
(74) *Attorney, Agent, or Firm* — Wenderoth, Lind & Ponack, L.L.P.

(57) ABSTRACT

To provide a hydrophilizing surface treatment liquid suppressing the deterioration over time of the effect of a surface treatment even when a surface-treated article is exposed to a variety of chemicals and a hydrophilizing treatment method in which the hydrophilizing surface treatment liquid is used. In a hydrophilizing surface treatment liquid including a polymerizable compound having an ethylenic unsaturated double bond (A), a polymerization initiator (B) and a solvent (S), a hydrophilic polymerizable compound (A1), an adhesive polymerizable compound (A2), an acidic polymerizable compound (A3a) and/or a basic polymerizable compound (A3b) are used as the polymerizable compound (A), and an aqueous solution including the polymerizable compound (A) at a concentration of 10% by mass has a pH at 23° C. of 6.5 or more and 7.5 or less.

11 Claims, No Drawings

SURFACE TREATMENT LIQUID AND HYDROPHILIZING TREATMENT METHOD

BACKGROUND OF THE INVENTION

Field of the Invention

The present invention relates to a surface treatment liquid and a hydrophilizing treatment method in which the surface treatment liquid is used.

Related Art

In order to modify the properties of surfaces of a variety of articles, surface treatments have been thus far carried out using a variety of surface treatment liquids. As surface modification, particularly, hydrophilization of the surfaces of articles has been significantly demanded, and a number of chemicals and surface treatment liquids for hydrophilization have been proposed. A surface treatment of an object using a chemical or surface treatment liquid for hydrophilization forms a coating on the surface of the object and hydrophilizes the surface of the object.

As such chemicals and surface treatment liquids for hydrophilization, for example, a hydrophilic coating liquid including a siloxane monomer having a nitrogen-containing heterocyclic structure and a betaine structure has been proposed (refer to Patent Document 1).

Patent Document 1: PCT International Publication No. WO2018/230514

SUMMARY OF THE INVENTION

For example, an object of a surface treatment such as a window and a mirror may be exposed by a chemical such as a washing agent that is used during washing. Particularly, windows or mirrors that are used in bathrooms or kitchens are often exposed to acidic detergents that are used to remove water deposits or basic detergents that are used to remove mold. In addition, regardless of the pH of washing agents, a variety of washing agents, including soap or shampoo, also include a variety of ionic surfactants such as fatty acid sodium salts, sodium dodecyl sulfate (SDS) and linear sodium alkyl ether sulfonate. Furthermore, washing agents may also include an organic acid or an organic base capable of generating an anion or cation having a hydrophobic portion such as oleic acid, behenic acid, dimethyl stearyl amine or dimethyl coconut amine.

However, regarding articles surface-treated with the conventional hydrophilizing treatment agent described in Patent Document 1, a problem is that, when the articles are exposed to washing agents including an acid, an alkali, a variety of ionic surfactants, an organic acid or organic base capable of generating an anion or cation having a hydrophobic portion or the like, the hydrophilicity on the surfaces of the surface-treated articles may gradually deteriorate over time.

The present invention has been made in consideration of the above-described problem, and an objective of the present invention is to provide a hydrophilizing surface treatment liquid suppressing the deterioration over time of the effect of a surface treatment even when a surface-treated article is exposed to a variety of chemicals and a hydrophilizing treatment method in which the hydrophilizing surface treatment liquid is used.

The present inventors found that, in a hydrophilizing surface treatment liquid including a polymerizable compound having an ethylenic unsaturated double bond (A), a polymerization initiator (B) and a solvent (S), when a hydrophilic polymerizable compound (A1), an adhesive polymerizable compound (A2), an acidic polymerizable compound (A3a) and/or a basic polymerizable compound (A3b) are used as the polymerizable compound (A) and an aqueous solution including the polymerizable compound (A) at a concentration of 10% by mass has a pH at 23° C. of 6.5 or more and 7.5 or less, the above-described objective can be achieved and completed the present invention. In more detail, the present invention provides the followings.

A first aspect of the present invention is a hydrophilizing surface treatment liquid including a polymerizable compound (A), a polymerization initiator (B) and a solvent (S),
  wherein the polymerizable compound (A) has an ethylenic unsaturated double bond,
  the polymerizable compound (A) includes a hydrophilic polymerizable compound (A1), an adhesive polymerizable compound (A2), an acidic polymerizable compound (A3a) and/or a basic polymerizable compound (A3b), and
  an aqueous solution including the polymerizable compound (A) at a concentration of 10% by mass has a pH at 23° C. of 6.5 or more and 7.5 or less.

A second aspect of the present invention is a hydrophilizing treatment method for hydrophilizing a surface of an object to be treated, including:
  applying the surface treatment liquid according to the first aspect to form a coating film on the surface of the object to be treated; and
  heating the coating film to form a coating on the surface of the object to be treated.

According to the present invention, it is possible to provide a hydrophilizing surface treatment liquid suppressing the deterioration over time of the effect of a surface treatment even when a surface-treated article is exposed to a variety of chemicals and a hydrophilizing treatment method in which the hydrophilic surface treatment liquid is used.

DETAILED DESCRIPTION OF THE INVENTION

<<Hydrophilizing Surface Treatment Liquid>>

The hydrophilizing surface treatment liquid includes a polymerizable compound (A), a polymerization initiator (B) and a solvent (S). Such a hydrophilizing surface treatment liquid is capable of hydrophilizing the surface of an object to be treated, which is an object of a surface treatment. Hereinafter, regarding the hydrophilizing surface treatment liquid, arbitrary components, essential components and the like will be described.

<Polymerizable Compound (A)>

The polymerizable compound (A) polymerizes by the action of the polymerization initiator (B) on the surface of an object to be treated and forms a resin coating favorably attached to the surface of the object to be treated. The polymerizable compound (A) has an ethylenic unsaturated double bond. Examples of a group having an ethylenic unsaturated double bond include an alkenyl group such as a vinyl group, a 1-propenyl group, a 2-n-propenyl group (allyl group), a 1-n-butenyl group, a 2-n-butenyl group or a 3-n-butenyl group, an acryloyl group, a methacryloyl group, an acryloyloxy group, a methacryloyloxy group, an acryloylamino group, and a methacryloylamino group. From the viewpoint of the polymerizing properties and the film-forming properties, the polymerizable compound (A) preferably includes a compound having one or more polymerizable groups selected from a vinyl group and an allyl group as the group having an ethylenic unsaturated double bond.

The polymerizable compound (A) includes a hydrophilic polymerizable compound (A1), an adhesive polymerizable compound (A2), an acidic polymerizable compound (A3a) and/or a basic polymerizable compound (A3b). The polymerizable compound (A) may include, in addition to the hydrophilic polymerizable compound (A1), the adhesive polymerizable compound (A2), the acidic polymerizable compound (A3a) and/or the basic polymerizable compound (A3b), a polyfunctional monomer (A4) or other monomer (A5) to an extent that the objective of the present invention is not impaired.

[Hydrophilic Polymerizable Compound (A1)]

The hydrophilic polymerizable compound (A1) is a compound having a hydrophilic group and an ethylenic unsaturated double bond. With the polymerizable compound (A) including the hydrophilic polymerizable compound (A1), a hydrophilic coating can be formed on the surface of the object to be treated using the hydrophilizing surface treatment liquid. The hydrophilic group is not particularly limited as long as the hydrophilic group is a functional group that has thus far been recognized as a hydrophilic group by a person skilled in the art and can be appropriately selected from such functional groups. Specific examples of the hydrophilic group include a polyoxyalkylene group such as polyoxyethylene group, a polyoxypropylene group, and a polyoxyalkylene group consisting of a block or random combination of oxyethylene group(s) and oxypropylene group(s), a carboxy group, a primary amino group, a secondary amino group, a hydroxy group, a phosphonic acid group, a phosphinic acid group, a sulfonic acid group, and the like. An organic group including these groups is preferable as the hydrophilic group.

As the hydrophilic group, a group represented by the following formula (ai) is preferable in view of superior hydrophilic effect.

$$-NH-R^{01} \quad (ai)$$

In the formula (ai), $R^{01}$ is an alkyl group having 1 or more and 4 or less carbon atoms substituted with one or more groups selected from the group consisting of an amino group, a sulfonic acid group, a phosphonic acid group, and a hydroxy group, or a hydrogen atom. Regarding $R^{01}$, the amino group corresponds to a cationic group, and the sulfonic acid group and the phosphonic acid group correspond to anionic groups. As the hydroxyl group, a phenolic hydroxyl group corresponds to an anionic group.

Specific examples of the hydrophilic group represented by the formula (ai) include the amino group and the groups represented by the following formulas. In the following formulas, $R^{01}$ is the same as $R^{01}$ above.

[Chem. 1]

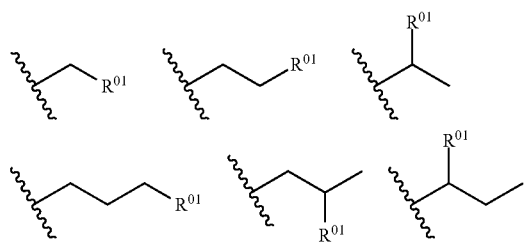

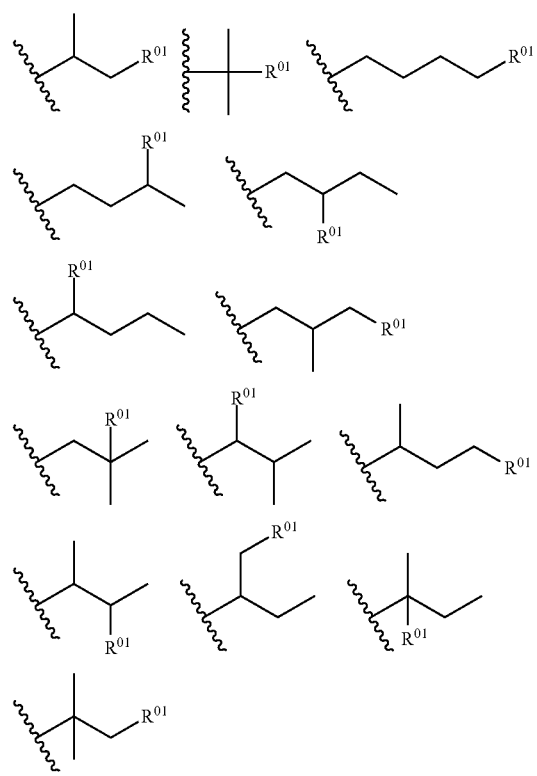

Among the specific examples of the hydrophilic group represented by the above formula (ai), following groups are exemplified as particularly preferable groups.

[Chem. 2]

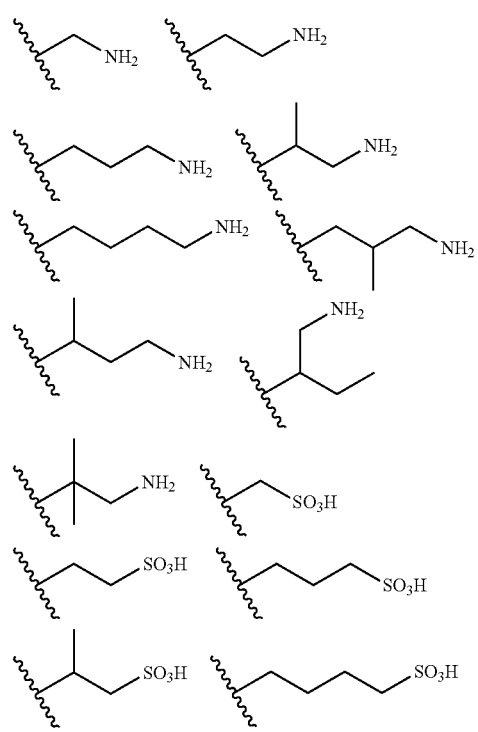

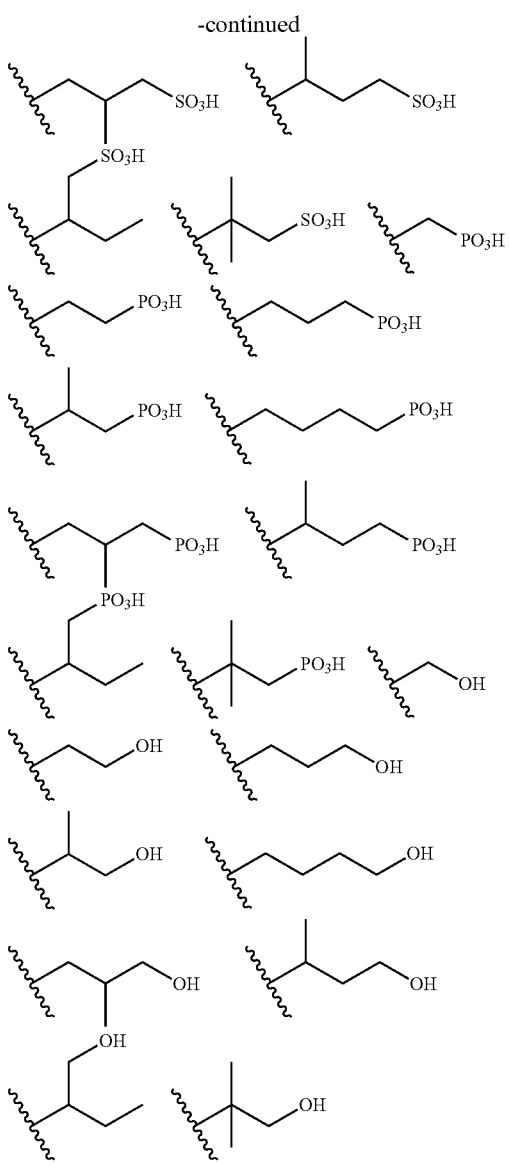

As the hydrophilic polymerizable compound (A1), a (meth)acrylamide compound represented by the following formula (a1-a) is preferable in view of polymerizability, ease of synthesis, or availability.

$$CH_2=CR^{02}-CO-NH-R^{01} \quad (a1-a)$$

In the formula (a1-a), $R^{01}$ is an alkyl group having 1 or more and 4 or less carbon atoms substituted with one or more groups selected from the group consisting of an amino group, a phosphonic acid group, and hydroxy group, or a hydrogen atom. $R^{02}$ is a hydrogen atom or a methyl group.

In the formula (a1-a), $R^{01}$ is as described above.

(Polymerizable Betaine Compound)

The polymerizable compound (A) preferably includes a polymerizable betaine compound having a betaine structure including a cationic group and an anionic group and a group having an ethylenic unsaturated double bond as the hydrophobic polymerizable compound (A1). Both the cationic group and the anionic group act as the hydrophilic group. The surface of the surface-treated object to be treated may come into contact with a washing liquid including a large amount of an anion having a hydrophobic group or cation having a hydrophobic group. In a case where a resin in the surface treatment liquid has only an anionic group such as a carboxy group, a carboxylate group, a sulfonic acid group or a sulfonate group as the hydrophilic group, this hydrophilic group may stop acting as a hydrophilic group due to an interaction with a cation having a hydrophobic group. In addition, in a case where the resin in the surface treatment liquid has only a cationic group such as a quaternary ammonium group as the hydrophilic group, the cationic group may stop acting as a hydrophilic group due to an interaction with an anion having a hydrophobic group. However, since a polymer of the polymerizable compound (A) including the polymerizable betaine compound has both a cationic group and an anionic group as the hydrophilic group, even when the surface of the surface-treated object to be treated comes into contact with a washing agent abundantly including a cation having a hydrophobic group or comes into contact with a washing agent abundantly including an anion having a hydrophobic group, any one of the cationic group and the anionic group is capable of maintaining the action as the hydrophilic group, and the hydrophilicity of the surface of the object to be coated is unlikely to deteriorate.

The number of the cationic groups and the number of the anionic groups in the polymerizable betaine compound are not particularly limited. In the polymerizable betaine compound, the number of the cationic groups and the number of the anionic groups are preferably the same as each other. The number of the cationic groups and the number of the anionic groups in the polymerizable betaine compound are each preferably one since the synthesis or procurement of the polymerizable betaine compound is easy.

In the polymerizable betaine compound, for example, the group having an ethylenic unsaturated double bond, the cationic group and the anionic group preferably bond together in this order through linking groups as necessary.

The cationic group is preferably a cationic group that is a quaternary ammonium cation. The anionic group is preferably a sulfonic acid anion group, a phosphonic acid anion group, or a carboxylic acid anion group.

Examples of the group having an ethylenic unsaturated double bond in the polymerizable betaine compound include an alkenyl group such as a vinyl group, a 1-propenyl group, a 2-n-propenyl group (an allyl group), a 1-n-butenyl group, a 2-n-butenyl group, and a 3-n-butenyl group. Among these groups, the vinyl group, and the 2-propenyl group (the allyl group) are preferred. In the polymerizable betaine compound, a number of the ethylenic unsaturated double bond is not particularly limited, and preferably 1 or 2.

As the polymerizable betaine compound, for example, compounds represented by the following formula (a1-i) or formula (a1-ii). The polymerizable betaine compound represented by the following formula (a1-i) or formula (a1-ii) include a cationic group having $N^+$ and an anionic group as R. Both the cationic group and the anionic group act as the hydrophilic group.

[Chem. 3]

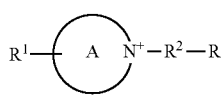

(a1-i)

In the formula (a1-i), $R^1$ is a hydrocarbon group having an ethylenic unsaturated double bond, $R^2$ is a divalent hydrocarbon group having 1 or more and 10 or less carbon atoms, R is an anionic group, and ring A is a heterocycle.

[Chem. 4]

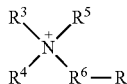

(a1-ii)

In the formula (a1-ii), $R^3$, $R^4$, and $R^5$ are each independently a hydrocarbon group having an ethylenic unsaturated double bond, or a hydrocarbon group having 1 or more and 10 or less carbon atoms, at least one of $R^3$, $R^4$, and $R^5$ is the hydrocarbon group having the ethylenic unsaturated double bond, $R^6$ is a divalent hydrocarbon group having 1 or more and 10 or less carbon atoms, and R is an anionic group.

In the formula (a1-i), a vinyl group, an alkenyl group such as a 1-propenyl group, a 2-n-propenyl group (an allyl group), a 1-n-butenyl group, a 2-n-butenyl group, and 3-n-butenyl group is exemplified as the hydrocarbon group having the ethylenic unsaturated double bond as $R^2$.

In the formula (a1-i), as the divalent hydrocarbon group as $R^2$, an alkylene group, an arylene group, and a group consisting of an alkylene group and an arylene group are exemplified, and the alkylene group is preferable. Specific examples of the alkylene group as R2 include a methylene group, an ethane-1,2-diyl group, a propane-1,3-diyl group, a propane-1,2-diyl group, a butane-1,4-diyl group, a pentane-1,5-diyl group, a hexane-1,6-diyl group, a heptane-1,7-diyl group, an octane-1,8-diyl group, a nonane-1,9-diyl group, and a decane-1,10-diyl group.

In the formula (a1-i), the heterocycle as the ring A may be an aromatic heterocycle or an aliphatic heterocycle. Examples of the aromatic heterocycle include nitrogen-containing aromatic heterocycles such as an imidazole ring, a pyrazole ring, a 1,2,3-triazole ring, a 1,2,4-triazole ring, a pyridine ring, a pyrimidine ring, a pyridazine ring and a pyrazine ring in which one arbitrary nitrogen atom in the nitrogen-containing aromatic heterocycle is quaternized. Examples of the aliphatic heterocycle include nitrogen-containing heterocycles such as a pyrrolidine ring, a piperidine ring and a piperazine ring in which one arbitrary nitrogen atom in the nitrogen-containing heterocycle is quaternized.

In the formula (a1-ii), examples of the hydrocarbon group having the ethylenic unsaturated double bond as $R^3$ to $R^5$ include an alkenyl group such as a vinyl group, a 1-propenyl group, a 2-propenyl group (an allyl group), a 1-n-butenyl group, a 2-n-butenyl group, a 3-n-butenyl group.

In the formula (a1-ii), as the hydrocarbon group as $R^3$ to $R^5$, an alkyl group, an aryl group, and an aralkyl group are exemplified, and the aralkyl group is preferable. The hydrocarbon group as $R^3$ to $R^5$ may have a substituent. The substituent that the hydrocarbon group as $R^3$ to $R^5$ may have is not particularly limited as long as the objective of the present invention is not impaired. Examples of the substituent include a halogen atom, a hydroxy group, an alkoxy group having 1 or more and 4 or less carbon atoms, an acyl group having 2 or more and 4 or less carbon atoms, an acyloxy group having 2 or more and 4 or less carbon atoms, an amino group, an alkylamino group substituted with one or two alkyl groups having 1 or more and 4 or less carbon atoms. Specific suitable examples of the alkyl group as $R^3$ to $R^5$ include a methyl group, an ethyl group, an n-propyl group, an isopropyl group, an n-butyl group, an isobutyl group, a sec-butyl group, a tert-butyl group, an n-pentyl group, an n-hexyl group, an n-heptyl group, an n-octyl group, a 2-ethylhexyl group, an n-nonyl group, and an n-decyl group.

In the formula (ai-ii), as a divalent hydrocarbon group as $R^6$, an alkylene group, an arylene group, and a group consisting of an alkylene group and an arylene group are exemplified, and the alkylene group is preferable. Specific examples of the alkylene group as $R^6$ include a methylene group, an ethane-1,2-diyl group, a propane-1,3-diyl group, a propane-1,2-diyl group, a butane-1,4-diyl group, a pentane-1,5-diyl group, a hexane-1,6-diyl group, a heptane-1,7-diyl group, an octane-1,8-diyl group, a nonane-1,9-diyl group, and a decane-1,10-diyl group.

As the polymerizable betaine compound having a sulfonic acid anion group as the anionic group, a monomer represented by the following formula (a1-iii) or (a1-iv) is preferable.

[Chem. 5]

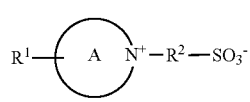

(a1-iii)

In the formula (a1-iii), $R^1$, $R^2$, and ring A are the same as $R^1$, $R^2$, and ring A in the formula (a1-i).

[Chem. 6]

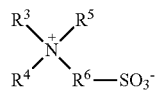

(a1-iv)

In the formula (a1-iv), $R^3$, $R^4$, $R^5$, and $R^6$ are the same as $R^3$, $R^4$, $R^5$, and $R^6$ in the formula (a1-ii).

As the monomer represented by the formula (a1-iii) or (a1-iv), a monomer represented by the following formula (a1-v), (a1-vi), or (a1-vii) is exemplified.

[Chem. 7]

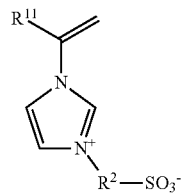

(a1-v)

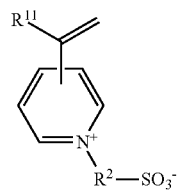

(a1-vi)

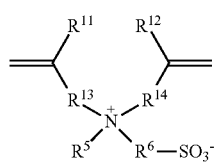
(a1-vii)

In the formula (ai-v), (ai-vi), and (a1-vii), $R^2$ is the same as the $R^2$ in the formula (a1-iii), $R^5$ and $R^6$ are the same as the $R^5$ and $R^6$ in the formula (ai-iv), $R^{11}$ and $R^{12}$ are each independently a hydrogen atom or a methyl group, and $R^{13}$ and $R^{14}$ are each independently a single bond, or an alkylene group having 1 or more and 4 or less carbon atoms.

In the formula (a1-v), (a1-vi), and (a1-vii), as the alkylene group as $R^{13}$ and $R^{14}$, a methylene group, an ethane-1,2-diyl group, a propane-1,3-diyl group, a propane-1,2-diyl group, and a butane-1,4-diyl group are exemplified.

As the polymerizable betaine compound having the anionic group such as a phosphonic acid anion group and a carboxy acid anion group, the monomer represented by the above formula (a1-ii) or (a1-iv), or a monomer where the sulfonic acid anion group (—$SO_3^-$) in the monomer represented by the above formula (a1-v), (a1-vi), or (a1-vii) is replaced by the phosphonic acid anion group (—$(PO3)2-$) or the carboxylic acid anion group (—$COO^-$) is exemplified.

Specific examples of the polymerizable betaine compound represented by the formula (a1-i) or the formula (a1-ii) include compounds of the following formulae and monomers obtained by substituting the sulfonic acid anionic group (—$SO_3^-$) in the compounds of the following formulae with a phosphonic acid anionic group (—$(PO_3)^{2-}$) or a carboxylic acid anionic group (—$COO^-$).

[Chem. 8]

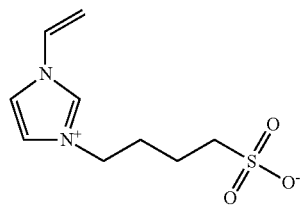

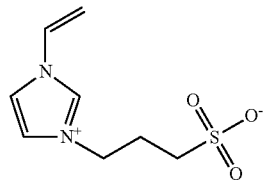

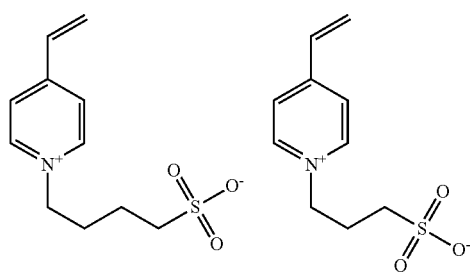

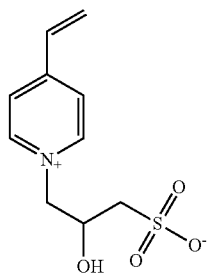

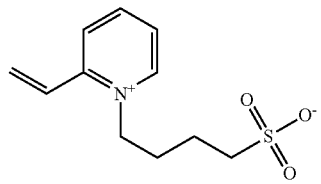

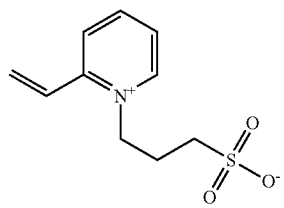

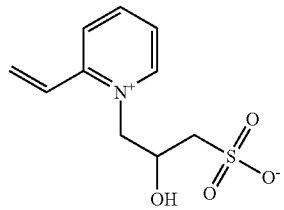

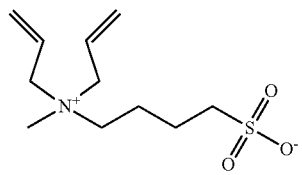

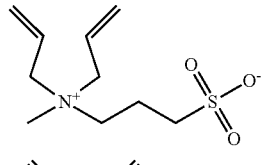

-continued

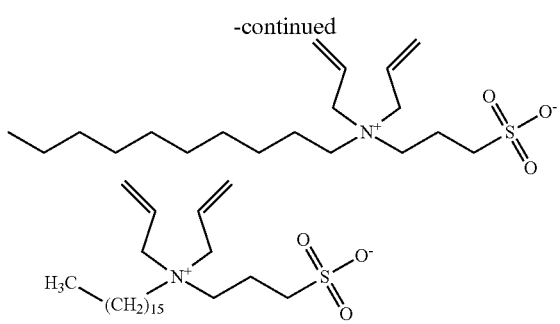

The polymerizable betaine compound represented by the formula (a1-i) or the formula (a1-ii) can be synthesized by a well-known reaction. For example, the polymerizable betaine compound can be obtained by reacting a compound having an anionic group with a compound having groups that serve as a group having an ethylenic unsaturated double bond and a cationic group. Specifically, for example, the compound represented by the formula (a1-ii) can be obtained by reacting the following compound and a sultone in a solvent. Examples of the sultone include sultones of 4-membered ring or more and 10-membered ring or less, and 1,3-propane sultone and 1,4-butane sultone are preferable.

[Chem. 9]

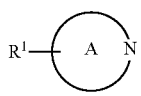

In the formula, $R^1$ is the same as $R^1$ in the (a1-i), and the ring A is a heterocycle.

In addition, a compound represented by the following formula (A1-viii) is also preferable as the polymerizable betaine compound. The polymerizable betaine compound represented by the following formula (a1-viii) having a cationic group including $N^+$ and an anionic group as $R^{20}$. Both the cationic group and the anionic group act as the hydrophilic group.

$$CH_2=CR^{15}-CO-NH-R^{16}-N^+(R^{17})(R^{18})-R^{19}-R^{20} \quad (a1\text{-viii})$$

In the formula (a1-viii), $R^{15}$ is a hydrogen atom or a methyl group, $R^{16}$ and $R^{19}$ are each independently a divalent hydrocarbon group having 1 or more and 10 or less carbon atoms, $R^{17}$ and $R^{18}$ are each independently an optionally substituted hydrocarbon group having 1 or more and 10 or less carbon atoms, and R20 is a sulfonic acid anion group ($-SO_3^-$), a phosphonic acid anion group ($-(PO_3)^{2-}$), or a carboxylic acid anion group ($-COO^-$).

In the formula (a1-viii), the divalent hydrocarbon group as $R^{16}$ and $R^{19}$, an alkylene group, an arylene group, and a group consisting of an alkylene group and an arylene group are exemplified, and the alkylene group is preferable. Specific examples of the alkylene group as $R^{16}$ and $R^{19}$ include, a methylene group, an ethane-1,2-diyl group, a propane-1,3-diyl group, a propane-1,2-diyl group, a butane-1,4-diyl group, a pentane-1,5-diyl group, a hexane-1,6-diyl group, a heptane-1,7-diyl group, an octane-1,8-diyl group, a nonane-1,9-diyl group, and a decane-1,10-diyl group.

In the formula (a1-viii), the hydrocarbon group as $R^{17}$ and $R^{18}$, an alkyl group, an aryl group, and an aralkyl group are exemplified, and the aralkyl group is preferable. The hydrocarbon group as $R^{17}$ and $R^{18}$ may have a substituent. The substituent that the hydrocarbon group as $R^{17}$ and $R^{18}$ may have is not particularly limited as long as the objective of the present invention is not impaired. Examples of the substituent include a halogen atom, a hydroxy group, an alkoxy group having 1 or more and 4 or less carbon atoms, an acyl group having 2 or more and 4 or less carbon atoms, an acyloxy group having 2 or more and 4 or less carbon atoms, an amino group, an alkylamino group substituted with one or two alkyl groups having 1 or more and 4 or less carbon atoms. Specific suitable examples of the alkyl group as $R^{17}$ and $R^{18}$ include a methyl group, an ethyl group, an n-propyl group, an isopropyl group, an n-butyl group, an isobutyl group, a sec-butyl group, a tert-butyl group, an n-pentyl group, an n-hexyl group, an n-heptyl group, an n-octyl group, a 2-ethylhexyl group, an n-nonyl group, and an n-decyl group.

In the formula (a1-viii), $R^{20}$ is a sulfonic acid anion group ($-SO_3^-$), a phosphonic anion group ($-PO_3^{2-}$) or a carboxylic acid anion group ($-COO^-$), and the sulfonic acid anion group ($-SO_3^-$) is preferable.

Suitable examples of the N-substituted (meth)acrylamide represented by the formula (a1-viii) include the following compounds. In the following formulas, $R^{15}$ is a hydrogen atom or a methyl group.

[Chem. 10]

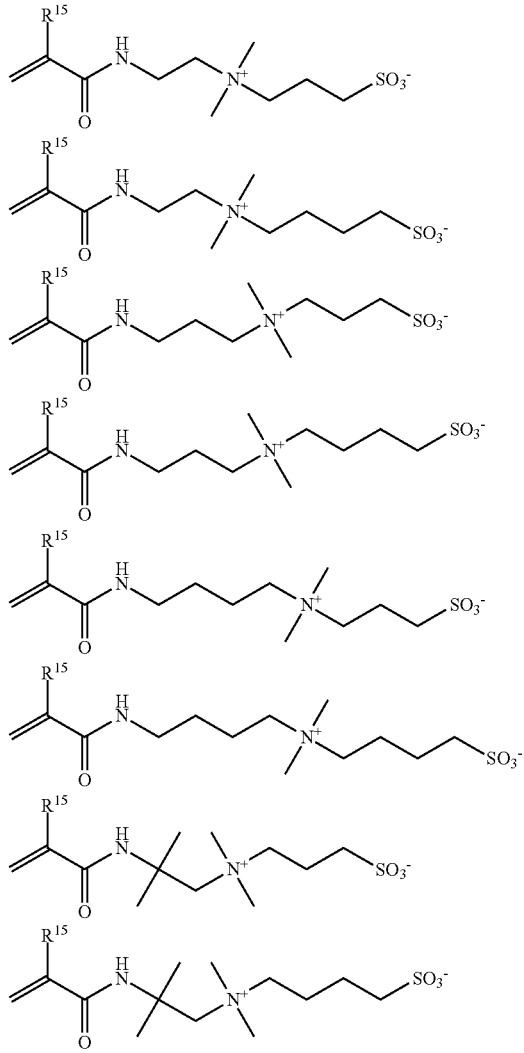

-continued

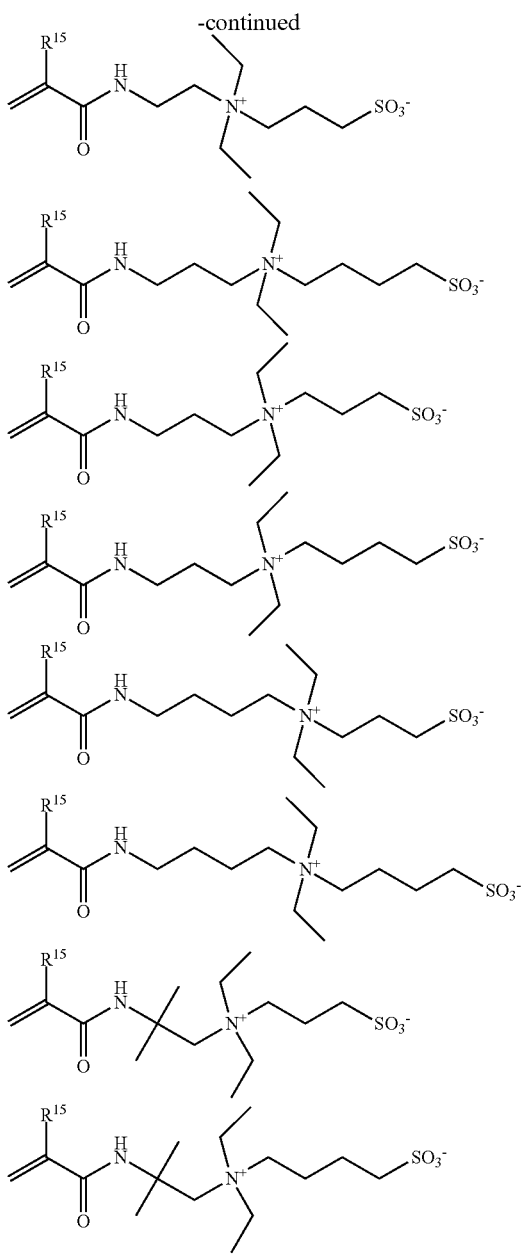

The content of the hydrophilic polymerizable compound (A1) in the polymerizable compound (A) is not particularly limited as long as the objective of the present invention is not impaired. From the viewpoint of satisfying both a favorable hydrophilization effect and the favorable adhesion of the resin coating to be formed to the surface of the object to be treated, the ratio of the number of moles of the hydrophilic polymerizable compound (A1) with respect to the number of moles of the polymerizable compound (A) is preferably 50 mol % or more and 99 mol % or less, more preferably 60 mol % or more and 99 mol % or less and still more preferably 70 mol % or more and 99 mol % or less.

[Adhesive Polymerizable Compound (A2)]

The polymerizable compound (A) includes an adhesive polymerizable compound (A2) together with the hydrophilic polymerizable compound (A1). The adhesive polymerizable compound (A2) has an ethylenic unsaturated double bond and an adhesive group. The adhesive group is a functional group capable of chemically bonding to the surface of the object to be treated by forming a covalent bond or capable of bonding to the surface of the object to be treated by the action of an electrostatic force based on the polarity or the like. As the adhesive group, at least one group selected from a hydrolysable silyl group, an amino group (—$NH_2$), a carboxy group, a mercapto group, a cyano group and a hydroxyl group is preferable. The hydrolysable silyl group reacts with the surface of the object to be treated to form a covalent bond and thereby strongly bonds a coating that is formed using the hydrophilizing surface treatment liquid to the surface of the object to be treated. In addition, the amino group (—$NH_2$), the carboxy group, the mercapto group, the cyano group and the hydroxyl group are polar groups and strongly bond the coating that is formed using the hydrophilizing surface treatment liquid to the surface of the object to be treated based on the polarity.

Preferable examples of the adhesive polymerizable compound (A2) include an unsaturated group-containing silicon compound (A2-1) having an ethylenic unsaturated double bond and a hydrolysable silyl group and a polar polymerizable compound (A2-2) having an ethylenic unsaturated double bond and at least one polar group selected from an amino group (—$NH_2$), a carboxy group, a mercapto group, a cyano group and a hydroxyl group.

(Unsaturated Group-Containing Silicon Compound (A2-1))

The unsaturated group-containing silicon compound (A2-1) has a group having an ethylenic unsaturated double bond and a hydrolysable silyl group.

The group having the ethylenic unsaturated double bond is not particularly limited as long as the unsaturated group-containing silicon compound (A2-1) is polymerizable with the polymerizable betaine compound (A1). Suitable examples of the group having the ethylenic unsaturated double bond include an alkenyl group such as a vinyl group, a 1-propenyl group, a 2-propenyl group (an allyl group), a 1-n-butenyl group, a 2-n-butenyl group and a 3-n-butenyl group; a monoalkenylamino group such as an N-vinylamino group, an N-1-propenylamino group, an N-allylamino group, an N-1-n-butenylamino group, an N-2-n-butenylamino group, and an N-3-n-butenylamino group; a dialkenylamino group such as an N,N-divinylamino group, an N,N-di(1-propenyl)amino group, an N,N-diallylamino group, an N,N-di(1-n-butenyl)amino group, an N,N-di(2-n-butenyl)amino group, an N,N-di(3-n-butehyl)amino group; an alkenyloxy group such as an allyloxy group, a 2-n-butenyloxy group, and 3-n-butenyloxy group; an alkenylaminocarbonyl group such as a vinylaminocarbonyl group, a 1-propenylaminocarbonyl group, an allylaminocarbonyl group, a 1-n-butenylaminocarbonyl group, a 2-n-butenylaminocarbonyl group, and a 3-n-butenylaminocarbonyl group; an alkenyloxycarbonyl group such as a vinyloxycarbonyl group, a 1-propenyloxycarbonyl group, an allyloxycarbonyl group, a 1-n-butenyloxycarbonyl group, a 2-n-butenyloxycarbonyl group, and a 3-n-oxycarbonyl group, a (meth)acryloyl group-containing group such as an acryloyl group, a methacryloyl group, an acryloyloxy group, a methacryloyloxy group, an acryloylamino group and a methacryloylamino group. Among these groups, the alkenyl group, and the (meth)acryloyl group-containing group are preferable. A number of carbon atoms of the alkenyl group is, for example, preferably 2 or more and 6 or less, and more preferably 2 or 3.

The hydrolyzable silyl group is a silyl group capable of forming a silanol group by hydrolysis. Suitable examples of the hydrolyzable silyl group include a group represented by —$SiR^{11}_{a}R^{12}_{3-a}$. Here, $R^{11}$ is a group capable of forming a silanol group by hydrolysis such as an alkoxy group and a halogen atom. The alkoxy group is preferably an alkoxy group having 1 or more and 4 or less carbon atoms such as a methoxy group, an ethoxy group, an n-propyloxy group, an isopropyloxy group, and n-butyloxy group. The halogen atom is preferably a chlorine atom, and a bromine atom, and more preferably a chlorine atom. $R^{12}$ may be various organic groups not corresponding to the group capable of forming a silanol group by hydrolysis as long as the objective of the present invention is not impaired. The organic group is preferably a hydrocarbon group having 1 or more and 10 or less carbon atoms. The hydrocarbon group may be an aliphatic group or an aromatic group. The structure of the hydrocarbon group may be linear, branched, cyclic or a combination thereof. Suitable examples of the hydrocarbon group having 1 or more and 10 or less carbon atoms include a methyl group, an ethyl group, an n-propyl group, an isopropyl group, an n-butyl group, an isobutyl group, a sec-butyl group, a tert-butyl group, an n-pentyl group, an n-hexyl group, an n-heptyl group, an n-octyl group, an n-nonyl group, an n-decyl group, a phenyl group, a naphthalene-1-yl group, a naphthalene-2-yl group, a benzyl group and a phenethyl group. Among these, the methyl group, and the ethyl group are preferred. The above-described hydrocarbon group may have a substituent such as an alkoxy group having 1 or more and 6 or less carbon atoms, a halogen atom, a hydroxy group, and a cyano group. a is preferably 2 or 3, and more preferably 3. In addition, in a case where a is two or three, a condensation reaction is likely to occur even between the groups represented by —SiR$^{11}_a$R$^{12}_{3-a}$ present adjacent to each other on the surface of the object to be treated. As a result, a network of siloxane bonds that spreads along the surface of the object to be treated is formed in the coating that is formed using the hydrophilizing surface treatment liquid, which makes it easy to particularly strongly bond the polymer of the polymerizable compound (A) to the surface of the object to be treated.

Specific examples of the hydrolyzable silyl group represented by —SiR$^{11}_a$R$^{12}_{3-a}$ include a trimethoxysilyl group, a triethoxysilyl group, a methyldimethoxysilyl group, an ethyldimethoxysilyl group, a methyldiethoxysilyl group, and an ethyldiethoxysilyl group.

For example, the unsaturated group-containing silicon compound (A2-1) is preferably a compound represented by the following formula (a2-1).

(a2-1)

In the formula (a2-1), $R^{11}$, $R^{12}$ and a are as described above for the hydrolyzable silyl group. $R^{13}$ is an alkenyl group having 2 or more and 6 or less carbon atoms. $R^{14}$ is —O— or —NH—. $R^{15}$ is a single bond, an alkylene group having 1 or more and 10 or less carbon atoms, an aromatic hydrocarbon group having 1 or more and 10 or less carbon atoms, or a nitrogen-containing heterocyclic group having 1 or more and 10 or less carbon atoms. b is 0 or 1.

$R^{13}$ is an alkenyl group having 2 or more and 6 or less carbon atoms. Suitable examples of the alkenyl group include a vinyl group, a 1-methylvinyl group, an allyl group, a 3-butenyl group, a 4-pentenyl group, and a 5-hexenyl group. When b is 1, $R^{13}$ is preferably the vinyl group or the 1-methylvinyl group. In other words, when b is 1, it is preferable that the group represented by $R^{13}$—CO—$R^{14}$— is an acryloyloxy group, an acryloylamino group, a methacryloyloxy group, or a methacryloylamino group.

The alkylene group as $R^{15}$ include a methylene group, an ethane-1,2-diyl group, a propane-1,3-diyl group, a butane-1,4-diyl group, a pentane-1,5-diyl group, a hexane-1,6-diyl group, a heptane-1,7-diyl group, an octane-1,8-diyl group, a nonane-1,9-diyl group, and a decane-1,10-diyl group. The aromatic hydrocarbon group as $R^{15}$ include p-phenylene group, m-phenylene group, o-phenylene group, a naphthalene-2,6-diyl group, a naphthalene-2,7-diyl group, a biphenyl-4,4'-diyl group, a biphenyl-3,4'-diyl group, and a biphenyl-3,3'-diyl group.

Specific examples of the nitrogen-containing heterocyclic group as $R^{15}$ include the group in which two hydrogen atoms are removed from the following heterocycles. Examples of the nitrogen-containing heterocycle include 5-membered ring such as a pyrrolidine ring, a pyrazolidine ring, an imidazolidine ring, a triazolidine ring, a tetrazolidine ring, a pyrroline ring, a pyrazoline ring, an imidazoline ring, a triazoline ring, a tetrazoline ring, a pyrrole ring, a pyrazole ring, an imidazole ring, a triazole, and a tetrazole ring; nitrogen-containing 6-membered ring such as a piperidine ring, a piperideine ring, a piperazine ring, a triazinane ring, a tetradinane ring, a pentazinane ring, a pyridine ring, a pyridazine ring, a pyrimidine ring, a pyrazine ring, a triazine ring, a tetrazine ring, and a pentazine ring; a nitrogen-containing 7-membered ring such as an azepane ring, a diazepane ring, a triazepane ring, a tetrazepam ring, an azepine ring, a diazepine ring, and a triazepine ring; a nitrogen-containing condensed polycycle such as an indole ring, an indolenine ring, an indoline ring, an isoindole ring, an isoindolenine ring, isoindoline ring, a benzimidazole ring, an indolizine ring, a purine ring, an indolizidine ring, a benzodiazepine ring, a quinoline ring, an isoquinoline ring, a quinolizidine ring, a quinoxaline ring, a cinnoline ring, a quinazoline ring, a phthalazine ring, a naphthyridine ring, and a pteridine ring.

Suitable examples of the silane compound represented by the formula (a2-1) include a silane compound including an unsaturated group such as a vinyltrimethoxysilane, a vinyltriethoxysilane, an allyltrimethoxysilane, and an allyltrimethoxysilane; a silane compound including a (meth)acryloxy group such as 3-methacryloxypropyltrimethoxysilane, 3-methacryloxypropyltriethoxysilane, 3-methacryloxypropylmethyldimethoxysilane, 3-methacryloxypropylmethyldiethoxysilane, 3-acryloxypropyltrimethoxysilane, and 3-acryloxypropyltriethoxysilane.

(Polar Polymerizable Compound (A2-2))

A polar polymerizable compound (A2-2) has a group having an ethylenic unsaturated double bond, and a polar group selected from the group consisting of an amino group, a carboxy group, a mercapto group, a cyano group, and a hydroxy group.

A compound represented by the following formula (A2-2) is preferable as the polar polymerizable compound (A2-2).

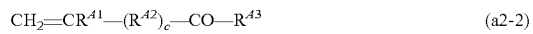
(a2-2)

In the formula (a2-2), $R^{41}$ is a hydrogen atom, or a methyl group, $R^{42}$ is a divalent hydrocarbon group, c is 0 or 1, $R^{43}$ is —OH, —OR$^{44}$, or —NH-RA$^4$, $R^{44}$ is a hydrocarbon group substituted with at least one polar group selected form the group consisting of an amino group, a carboxy group, a mercapto group, a cyano group, and a hydroxy group.

In the above formula (a2-2), $R^{42}$ is a divalent hydrocarbon group. A number of carbon atoms of the divalent hydrocarbon atom is not particularly limited as long as the objective of the present invention is not impaired. A number of carbon atoms of the divalent hydrocarbon group as $R^{42}$ is preferably 1 or more and 20 or less, more preferably 1 or more and 12 or less, particularly preferably 1 or more and 10 or less, and most preferably 1 or more and 6 or less, since the compound represented by the formula (a2-2) is easily prepared and easily available.

The divalent hydrocarbon group as $R^{42}$ may be an aliphatic group, an aromatic group or a hydrocarbon group including an aliphatic portion and an aromatic portion. In a case where the divalent hydrocarbon group is an aliphatic group, the aliphatic group may be a saturated aliphatic group or an unsaturated aliphatic group. In addition, the structure of the aliphatic group may be linear, branched, cyclic or a combination of these structures.

Suitable specific examples of the $R^{42}$ include a methylene group, an ethane-1,2-diyl group, an ethane-1,1-diyl group, a propane-1,3-diyl group, a propane-1,1-diyl group, a propane-2,2-diyl group, an n-butane-1,4-diyl group, an n-pentane-1,5-diyl group, an n-hexane-1,6-diyl group, an n-heptane-1,7-diyl group, an n-octane-1,8-diyl group, an n-nonane-1,9-diyl group, an n-decane-1,10-diyl group, an o-phenylene group, a m-phenylene group, a p-phenylene group, a naphthalene-2,6-diyl group, a naphthalene-2,7-diyl group, a naphthalene-1,4-diyl group, a biphenyl-4,4'-diyl group, and the like.

$R^{43}$ is —OH, —OR$^{44}$, or —NH—R$^{44}$. $R^{44}$ is a hydrocarbon group substituted with one or more polar group selected from the group consisting of an amino group, a carboxy group, a mercapto group, a cyano group and a hydroxy group. The hydrocarbon group constituting a main skeleton of the group of $R^{44}$ may be a linear, branched, or cyclic aliphatic group, or an aromatic hydrocarbon group. A number of carbon atoms of the linear, branched, or cyclic aliphatic group is preferably 1 or more and 20 or less, and more preferably 1 or more and 12 or less. Suitable examples of the linear or branched aliphatic group include a methyl group, an ethyl group, an n-propyl group, an isopropyl group, an n-butyl group, an isobutyl group, a sec-butyl group, a tert-butyl group, an n-pentyl group, an isopentyl group, a neopentyl group, a sec-pentyl group, a tert-pentyl group, an n-hexyl group, an n-heptyl group, an n-octyl group, an n-nonyl group, an n-decyl group, and the like. Suitable examples of the cyclic aliphatic group include a cycloalkyl group such as a cyclopropyl group, a cyclobutyl group, a cyclopentyl group, a cyclohexyl group, and a cyclooctyl group; a group in which one hydrogen atom is removed from polycycloalkane such as adamantane, norbornane, isobornane, tricyclodecane, and tetracyclododecane, or a group in which one hydrogen atom is removed from C1-C4 alkyl substitute of these polycycloalkanes. Specific examples of the aromatic hydrocarbon group include a phenyl group, a naphthyl group, an anthranyl group, a phenanthrenyl group, a biphenylyl group, and the like. The aromatic hydrocarbon group is optionally substituted with a C1-C4 alkyl group such as a methyl group, and an ethyl group.

Specific examples of the compound represented by the formula (a2-2) include the following compounds.

[Chem. 11]

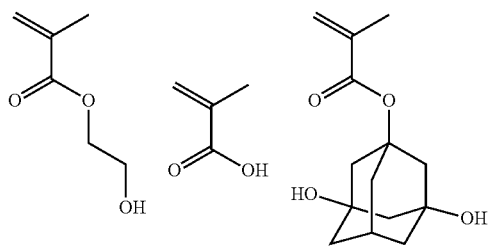

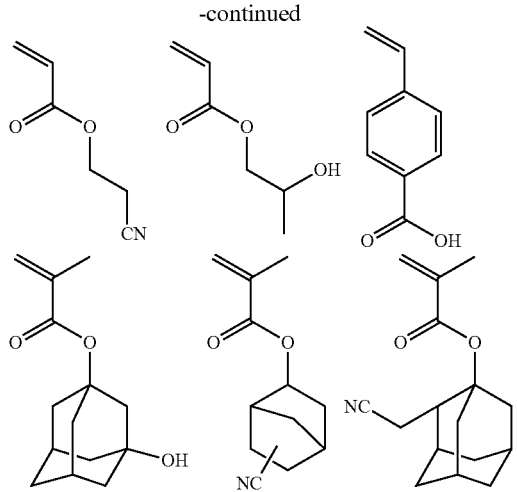

As the polar polymerizable compound (A2-2), a compound represented by the following formula (a2-3) is also preferred.

$$(R^{3a}-R^{2a})_n-X-R^{1a} \quad \text{(a2-3)}$$

In the formula (a2-3), $R^{1a}$ is an organic group having an ethylenic unsaturated double bond, $R^{2a}$ is a single bond, or an alkylene group having 1 or more and 10 or less carbon atoms, $R^{3a}$ is a hydrogen atom or a polar group selected from the group consisting of an amino group, a carboxy group, a mercapto group, a cyano group and a hydroxy group, n is 1 or 2, and X is a nitrogen-containing heterocyclic group having a valency of n+1. When n is 1, $R^{3a}$ is the polar group. When n is 2 at least one $R^{3a}$ is the polar group.

In the formula (a2-3), $R^{1a}$ is an organic group having one or more ethylenic unsaturated double bond. Suitable examples of the organic group having one or more ethylenic unsaturated double bond include groups represented by the following formulas (a2-3i) to (a2-3vii). In the formulas (a2-3i) to (a2-3vi), $R^{a01}$ is an alkenyl group having 1 or more and 10 or less carbon atoms, and $R^{a02}$ is a hydrocarbon group having 1 or more and 10 or less carbon atoms.

| | |
|---|---|
| —R$^{a01}$ | (a2-3i) |
| —NH—R$^{a01}$ | (a2-3ii) |
| —N(R$^{a01}$)(R$^{a02}$) | (a2-3iii) |
| —N(R$^{a01}$)$_2$ | (a2-3iv) |
| —O—R$^{a01}$ | (a2-3v) |
| —CO—NH—R$^{a01}$ | (a2-3vi) |
| —CO—O—R$^{a01}$ | (a2-3vii) |

A number of carbon atoms of the alkenyl group as $R^{a01}$ is preferably 1 or more and 6 or less, and more preferably 1 or more and 4 or less. The alkenyl group as $R^{a01}$ may be a linear alkenyl group or a branched alkenyl group. The hydrocarbon group as $R^{a02}$ may be an aliphatic group, an aromatic group, or a combination of an aliphatic group and an aromatic group. A number of carbon atoms of the hydrocarbon group as $R^{a02}$ is preferably 1 or more and 6 or less, more preferably 1 or more and 4 or less, and further preferably 1 or more and 3 or less.

Specific examples of the organic group having one or more ethylenic unsaturated double bond as $R^{1a}$ include, an alkenyl group such as a vinyl group, a 1-propenyl group, a 2-propenyl group (an allyl group), a 1-n-butenyl group, a 2-n-butenyl group, and a 3-n-butenyl group; a monoalkenylamino group such as an N-vinylamino group, an N-1-propenylamino group, an N-allylamino group, an N-1-n-butenylamino group, an N-2-n-butenyl amino group, and an N-3-n-butenylamino group; a dialkenylamino group such as an N,N-divinylamino group, an N,N-di(1-propenyl)amino group, an N,N-diallylamino group, an N,N-di(1-n-butenyl)amino group, an N,N-di(2-n-butenyl)amino group, and an N,N-di(3-n-butenyl)amino group; an alkenyloxy group such as a allyloxy group, a 2-n-butenyloxy group, and a 3-n-butenyloxy group; an alkenylaminocarbonyl group such as a vinylaminocarbonyl group, a 1-propenylaminocarbonyl group, an allylaminocarbonyl group, a 1-n-butenylaminocarbonyl group, a 2-n-butenylaminocarbonyl group, and a 3-n-butenylaminocarbonyl group; an alkenyloxycarbonyl group such as a vinyloxycarbonyl group, a 1-propenyloxycarbonyl group, an allyloxycarbonyl group, a 1-n-butenyloxycarbonyl group, a 2-n-butenyloxycarbonyl group, and a 3-n-butenyloxycarbonyl group; a (meth)acryloyl group-containing group such as an acryloyl group, a methacryloyl group, an acryloyloxy group, a methacryloyloxy group, an acryloylamino group, and a methacryloylamino group. Among these groups, the vinyl group, the allyl group, the N,N-diallylamino group, the allyloxy group, the acryloyl group, the methacryloyl group, the acryloyloxy group, and the methacryloyloxy group are preferable, and the N,N-diallylamino group is more preferable.

In the formula (a2-3), Rea is a single bond, or an alkylene group having 1 or more and 10 or less carbon atoms. A number of carbon atoms of the alkylene group is preferably 1 or more and 6 or less, more preferably 1 or more and 4 or less, and further preferably 1 or more and 3 or less. Specific examples of the alkylene group having 1 or more and 10 or less carbon atoms include a methylene group, an ethane-1,2-diyl group, an ethane-1,1-diyl group, a propane-1,3-diyl group, a propane-1,1-diyl group, a propane-2,2-diyl group, an n-butane-1,4-diyl group, an n-pentane-1,5-diyl group, an n-hexane-1,6-diyl group, an n-heptane-1,7-diyl group, an n-octane-1,8-diyl group, an n-nonane-1,9-diyl group, and an n-decane-1,10-diyl group. Among these alkylene groups, the methylene group, the ethane-1,2-diyl group, and the propane-1,3-diyl group are preferable, and the methylene group, and the ethane-1,2-diyl group are more preferable.

In the formula (a2-3), X is a (n+1)-valent nitrogen-containing heterocycle. n is one or two. The nitrogen-containing heterocycle may be an aromatic group or an aliphatic group. The nitrogen-containing heterocycle may be a monocycle or a condensed polycycle in which a monocyclic nitrogen-containing heterocycle bonds to one or more monocycles selected from a monocyclic aromatic hydrocarbon ring and a monocyclic nitrogen-containing heterocycle. In addition, the nitrogen-containing heterocycle may be a ring in which two or more rings selected from a monocyclic nitrogen-containing heterocycle and a condensed polycyclic nitrogen-containing heterocycle bond together through a single bond.

In the formula (a2-3), the group represented by $R^{1a}$ and a group represented by $R^{3a}-R^{2a}-$ may bond onto a carbon atom as a ring constituent atom of the nitrogen-containing heterocycle represented by X or may bond onto a nitrogen atom as a ring constituent atom.

Specific examples of the nitrogen-containing heterocycle giving X include a nitrogen-containing 5-membered ring such as a pyrrolidine ring, a pyrazolidine ring, an imidazolidine ring, a triazolidine ring, a tetrazolidine ring, a pyrroline ring, a pyrazoline ring, an imidazoline ring, a triazoline ring, a tetrazoline ring, a pyrrole ring, a pyrazole ring, an imidazole ring, a triazole, and a tetrazole ring; a nitrogen-containing 6-membered ring such as a piperidine ring, a piperideine ring, a piperazine ring, a triazinane ring, a tetradinane ring, a pentazinane ring, a pyridine ring, a pyridazine ring, a pyrimidine ring, a pyrazine ring, a triazine ring, a tetrazine ring, and a pentazine ring; a nitrogen-containing 7-membered ring such as an azepane ring, a diazepane ring, a triazepane ring, a tetrazepam ring, an azepine ring, a diazepine ring, and a triazepine ring; a nitrogen-containing condensed polycycle such as an indole ring, an indolenine ring, an indoline ring, an isoindole ring, an isoindolenine ring, isoindoline ring, a benzimidazole ring, an indolizine ring, a purine ring, an indolizidine ring, a benzodiazepine ring, a quinoline ring, an isoquinoline ring, a quinolizidine ring, a quinoxaline ring, a cinnoline ring, a quinazoline ring, a phthalazine ring, a naphthyridine ring, and a pteridine ring; a polycycle in which two or more rings selected from these nitrogen-containing heterocycles are joined via a single bond. X derived from the nitrogen-containing heterocycle is preferably a divalent or trivalent group including a nitrogen-containing 6-membered ring, more preferably a divalent or trivalent group including a triazine ring, and further preferably a 1,3,5-triazine-2,4-diyl group and a 1,3,5-triazine-2,4,6-triyl group in view of good adhesion of the polymer of the polymerizable compound (A) to the surface of the object to be treated.

Specific examples of the divalent or trivalent nitrogen-containing heterocycle as X include the following groups.

[Chem. 12]

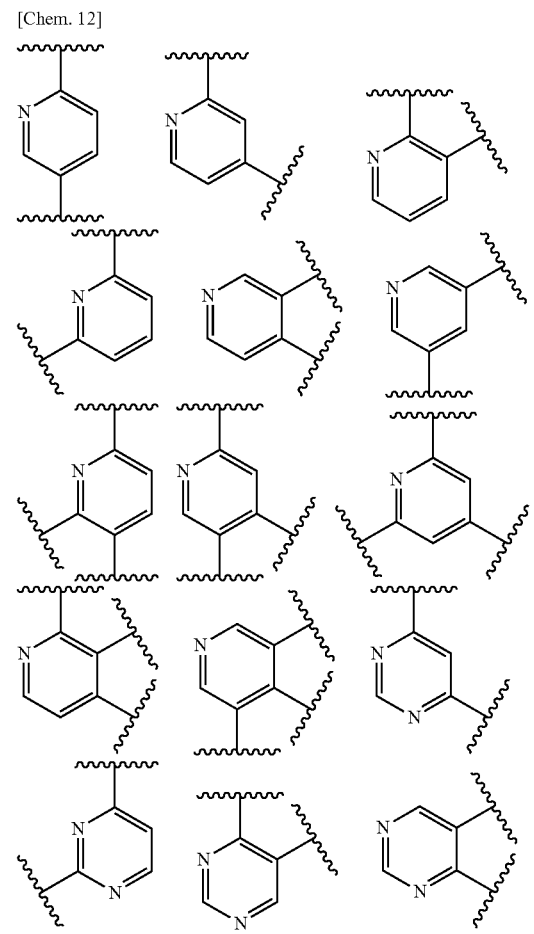

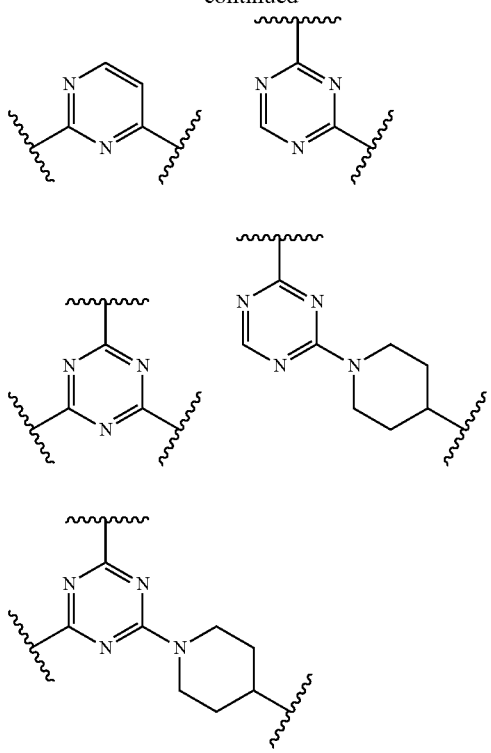
Specific examples of the compound represented by the formula (a2-3) include the following compounds.
[Chem. 13]
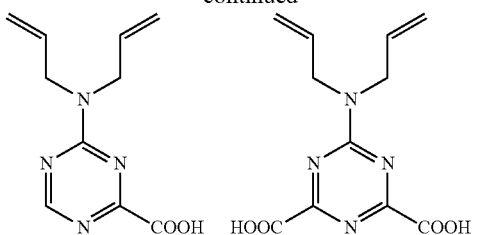
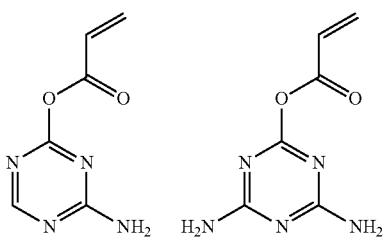
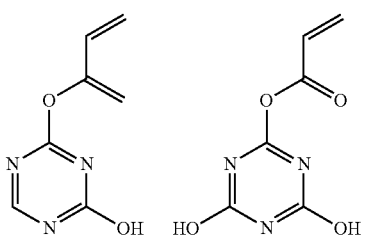
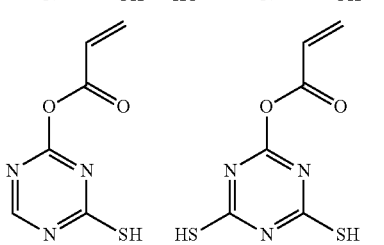
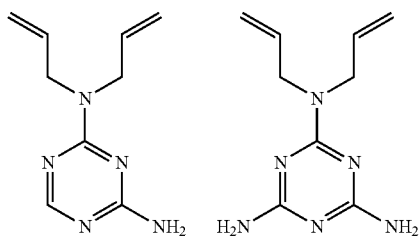
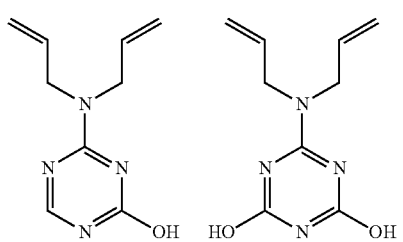
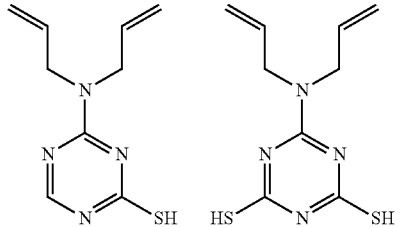
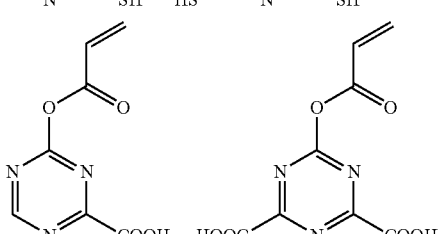
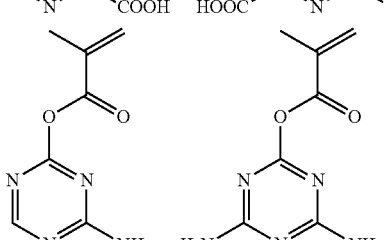
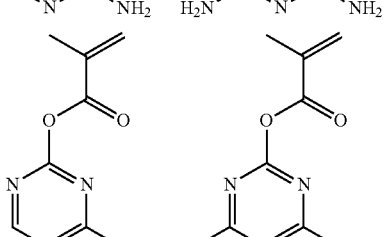

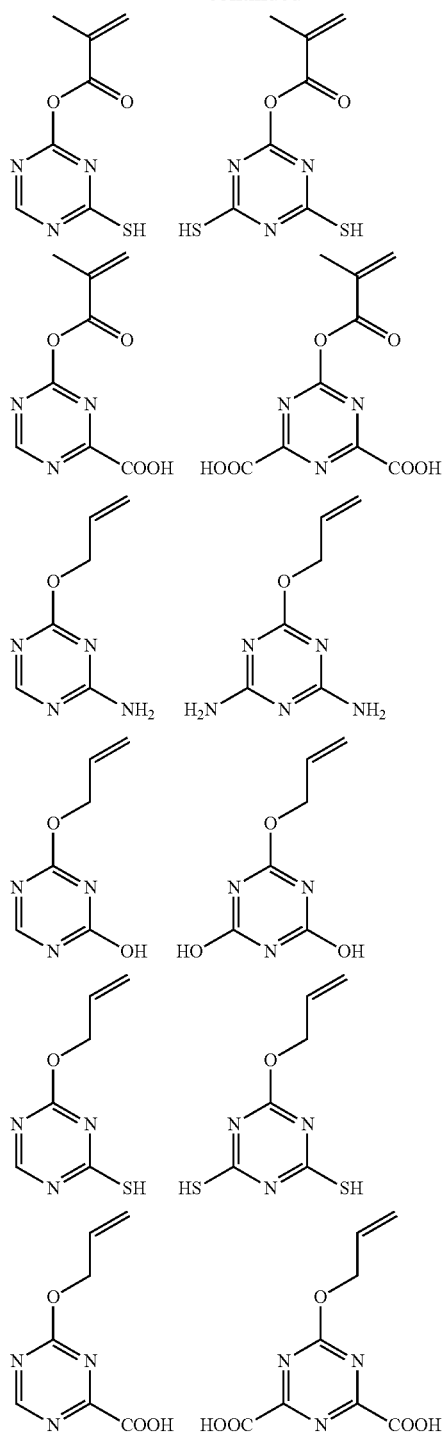
[Chem. 14]
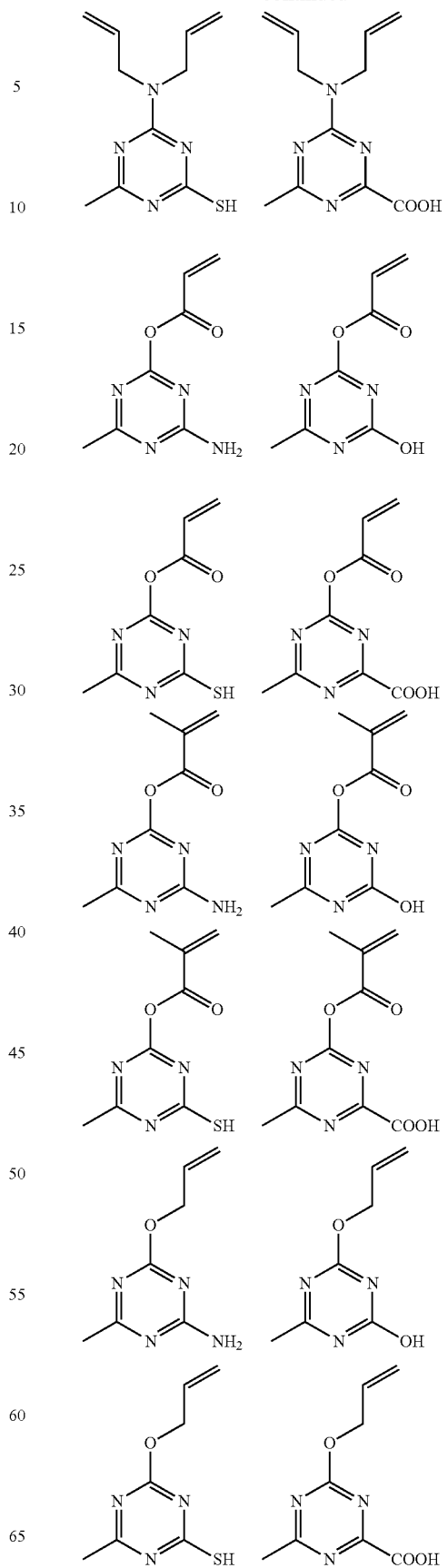

-continued

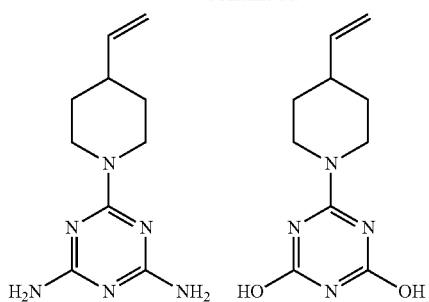
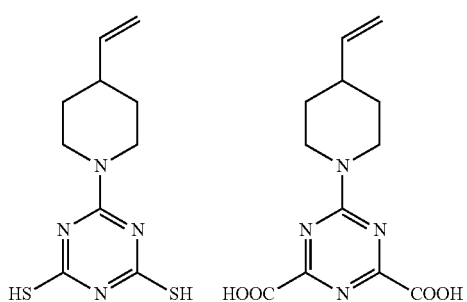
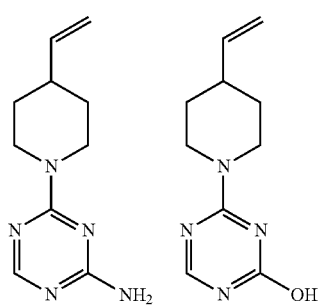
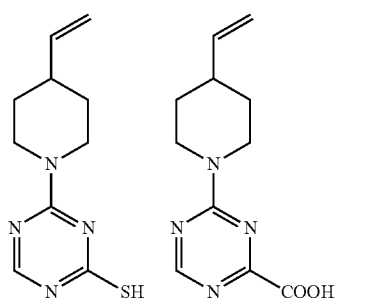
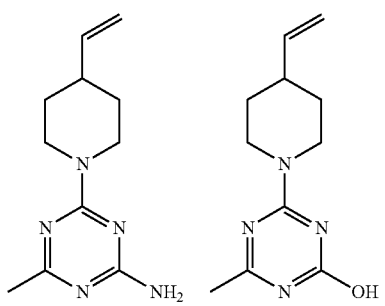

-continued

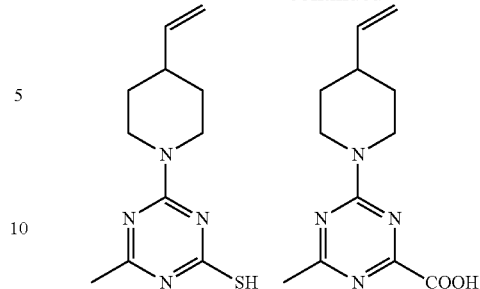

Among above compounds, the following compound are preferable.

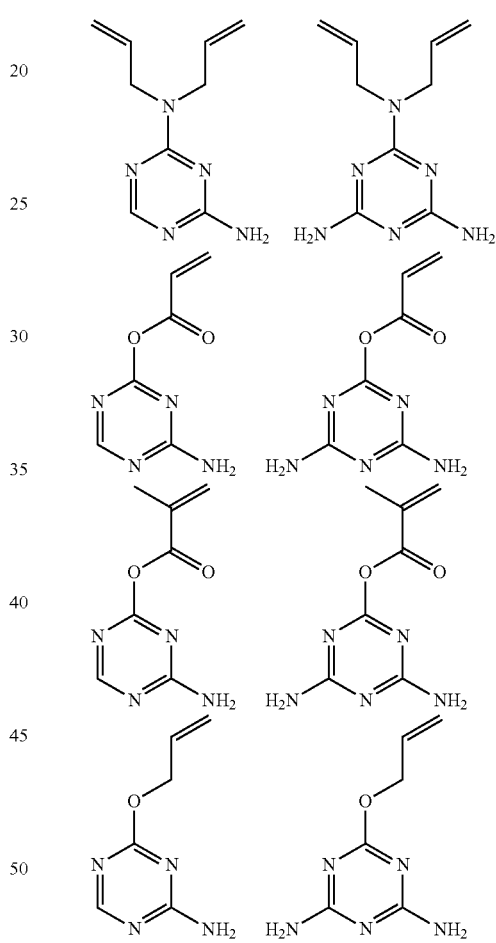

In addition, it is also preferable to use a polyfunctional compound having a hydroxyl group such as N,N'-di(meth)acryloyl-1,2-dihydroxyethylenediamine, glycerol di(meth)acrylate, pentaerythritol tri(meth)acrylate, pentaerythritol di(meth)acrylate, dipentaerythritol penta(meth)acrylate, 2-hydroxy-3-((meth)acryloyloxypropyl) (meth)acrylate, ethyleneglycol diglycidyl ether di(meth)acrylate, diethyleneglycol diglycidyl ether di(meth)acrylate, and diglycidyl phthalate di(meth)acrylate as the polar polymerizable compound (A2-2).

Such a polyfunctional polar polymerizable compound (A2-2) is capable of improving the adhesion of the resin coating that is formed by the polymerization of the polymerizable compound (A) to the surface of the object to be treated not only by the action of the hydroxyl group but also by the crosslinking of molecular chains. The ratio of the number of moles of the adhesive polymerizable compound (A2) with respect to the number of moles of the polymerizable compound (A) is not particularly limited as long as the objective of the present invention is not impaired. From the viewpoint of satisfying both a favorable hydrophilization effect and the favorable adhesion of the resin coating to be formed to the surface of the object to be treated, the ratio of the number of moles of the adhesive polymerizable compound (A2) with respect to the number of moles of the polymerizable compound (A) is preferably 0.1 mol % or more and 30 mol % or less, more preferably 0.1 mol % or more and 20 mol % or less and still more preferably 0.1 mol % or more and 10 mol % or less, in view of satisfying both adhesion of the resin (A) to the surface of the object to be treated and a favorable hydrophilization effect.

[Acidic Polymerizable Compound (A3a) and Basic Polymerizable Compound (A3b)]

Regarding the hydrophilizing surface treatment liquid, an aqueous solution including the polymerizable compound (A) at a concentration of 10% by mass has a pH at 23° C. of 6.5 or more and 7.5 or less. When the pH of the aqueous solution of the polymerizable compound (A) is adjusted as described above, the resin coating that is formed on the surface of the object to be treated using the hydrophilizing surface treatment liquid becomes electrostatically neutral. As a result, even when the surface-treated surface of the object to be treated is exposed to a variety of chemical solutions such as an anionic chemical solution or a cationic chemical solution, an anionic component or cationic component of the chemical solution is unlikely to bond to the coating, and the surface treatment effect is unlikely to deteriorate over time.

The method for adjusting the pH of the aqueous solution including the polymerizable compound (A) at a concentration of 10% by mass is not particularly limited. The polymerizable compound (A) includes the acidic polymerizable compound (A3a) and/or the basic polymerizable compound (A3b). The pH at 23° C. of the aqueous solution including the polymerizable compound (A) at a concentration of 10% by mass is preferably adjusted by, in the polymerizable compound (A), adjusting the content of the acidic polymerizable compound (A3a) and/or the basic polymerizable compound (A3b) in the polymerizable compound (A).

(Acidic Polymerizable Compound (A3a))

An acidic polymerizable compound (A3a) has an ethylenic unsaturated double bond and an acidic group. As the acidic group, a sulfonic acid group, a carboxylic acid group, and a phosphonic acid group are preferred.

In the acidic polymerizable compound (A3a), a structure of a part other than the ethylenic unsaturated double bond and the acidic group is not particularly limited as long as an aqueous solution of the acidic polymerizable compound (A3) is acidic. Suitable examples of the acidic polymerizable compound (A3a) include, an alkenyl sulfonic acid having 2 or more and 10 or less carbon atoms, a (meth)acryloyloxyalkyl sulfonic acid having 3 or more and 10 or less carbon atoms, an alkenyl-substituted arene sulfonic acid having 8 or more and 20 or less carbon atoms, an unsaturated aliphatic carboxylic acid having 3 or more and 10 or less carbon atoms, a (meth)acryloyloxyalkanoic acid having 4 or more and 10 or less carbon atoms, an alkenyl-substituted arene carboxylic acid having 9 or more and 20 or less carbon atoms, a phosphoric acid alkyl ester having 2 or more and 10 or less carbon atoms, a phosphonic acid (meth)acryloyloxyalkyl ester having 3 or more and 10 or less carbon atoms, an alkenyl-substituted aryl phosphonic acid ester having 8 or more and 20 or less carbon atoms, an alkenyl phosphonic acid having 2 or more and 10 or less carbon atoms, a (meth)acryloyloxyalkyl phosphonic acid having 3 or more and 10 or less carbon atoms, and an alkenyl-substituted arene phosphonic acid having 8 or more and 20 or less carbon atoms.

Specific examples of the acidic polymerizable compound (A3a) include a vinyl sulfonic acid, an allyl sulfonic acid, a 3-butene-1-sulfonic acid, a 4-pentene-1-sulfonic acid, a 5-hexene-1-sulfonic acid, a 2-(meth)acryloyloxyethane-1-sulphonic acid, a 3-(meth)acryloxypropane-1-sulfonic acid, a 4-(meth)acryloyloxybutane-1-sulfonic acid, a 4-vinylbenzene sulfonic acid, a 3-vinylbenzene sulfonic acid, a 2-vinylbenzene sulfonic acid, an acrylic acid, a methacrylic acid, a 3-butenoic acid, a 4-pentenoic acid, a 5-pentenoic acid, a (meth)acryloyloxy acetic acid, a 3-(meth)acryloyloxy propionic acid, a 4-(meth)acryloyloxy butanoic acid, a 4-vinylbenzoic acid, a 3-vinylbenzoic acid, a 2-vinylbenzoic acid, a phosphoric acid vinyl ester, a phosphoric acid allyl ester, a phosphoric acid isopropenyl ester, a phosphoric acid 3-butenyl ester, a phosphoric acid 4-pentenyl ester, a phosphoric acid (meth)acryloyloxymethyl ester, a phosphoric acid 2-(meth)acryloyloxyethyl ester, a phosphoric acid 3-(meth)acryloyloxypropyl ester, a phosphoric acid 4-(meth)acryloyloxybutyl ester, a phosphoric acid 4-vinylphenyl ester, a phosphoric acid 3-vinylphenyl ester, a phosphoric acid 2-vinylphenyl ester, a vinylphosphonic acid, an allylphosphonic acid, a 3-butenylphosphonic acid, and a 4-pentenylphosohonic acid.

(Basic Polymerizable Compound (A3b))

The basic polymerizable compound (A3b) has an ethylenic unsaturated double bond and a basic group. Examples of the basic group include a primary amino group, a secondary amino group, a tertiary amino group and a basic aromatic heterocyclic group. The structure of a portion other than the ethylenic unsaturated double bond and the basic group in the basic polymerizable compound (A3b) is not particularly limited as long as an aqueous solution of the basic polymerizable compound (A3b) exhibits basicity. Specific examples of the basic polymerizable compound (A3b) include a vinylamine, an allylamine, a 3-butenylamine, a 4-pentenylamine, a divinylamine, a diallylamine, a di(3-butenyl)amine, a di(4-pentenyl)amine, a triallylamine, a 4-vinylaniline, a 3-vinylaniline, a 2-vinylaniline, a 4-vinylpyridne, a 3-vinylpyridine, a 2-vinylpyridine, a 2-vinyl-1H-imidazole, and 2-allyl-1H-imidazole.

The amount of the acidic polymerizable compound (A3a) and the basic polymerizable compound (A3b) used is not particularly limited as long as the pH at 23° C. of the aqueous solution including the polymerizable compound (A) at a concentration of 10 mass % is 6.5 or more and 7.5 or less. Regarding the amount of the acidic polymerizable compound (A3a) and the basic polymerizable compound (A3b) used, the total amount of both compounds is preferably 0.1 mol % or more and 30 mol % or less, more preferably 0.1 mol % or more and 20 mol % or less and still more preferably 0.1 mol % or more and 10 mol % or less of the number of moles of the polymerizable compound (A). The polymerizable compound (A) may include only the acidic polymerizable compound (A3a) or the basic polymerizable compound (A3b) or may include the acidic polymerizable compound (A3a) and the basic polymerizable compound (A3b) in combination.

[Polyfunctional Monomer (A4)]

The polymerizable compound (A) may include a polyfunctional monomer (A4) other than the hydrophilic polymerizable compound (A1), the adhesive polymerizable compound (A2), the acidic polymerizable compound (A3a) and the basic polymerizable compound (A3b). The polyfunctional monomer (A4) is a compound that has two or more ethylenic unsaturated double bonds and does not correspond to the hydrophilic polymerizable compound (A1), the adhesive polymerizable compound (A2), the acidic polymerizable compound (A3a) and the basic polymerizable compound (A3b). The polyfunctional monomer (A4) crosslinks molecular chains in the resin coating that is formed by the polymerization of the polymerizable compound (A). The crosslinking improves the adhesion of the resin coating to the surface of the object to be treated.

Specific examples of the polyfunctional monomer (A4) include an ethyleneglycol di(meth)acrylate, a diethyleneglycol di (meth)acrylate, a triethyleneglycol di(meth)acrylate, a tetraethyleneglycol di(meth)acrylate, a pentaethyleneglycol di(meth)acrylate, a hexaethyleneglycol di(meth)acrylate, a heptaethyleneglycol di(meth)acrylate, an octaethyleneglycol di(meth)acrylate, a nonaethyleneglycol di(meth)acrylate, a decaethyleneglycol di(meth)acrylate, a propyleneglycol di(meth)acrylate, a dipropyleneglycol di(meth)acrylate, a tripropyleneglycol di (meth)acrylate, a tetrapropyleneglycol di(meth)acrylate, a pentapropyleneglycol di(meth)acrylate, a hexapropyleneglycol di(meth)acrylate, a heptapropyleneglycol di(meth)acrylate, an octapropyleneglycol di(meth)acrylate, a nonapropyleneglycol di(meth)acrylate, a decapropyleneglycol di(meth)acrylate, a butyleneglycol di(meth)acrylate, a neopentylglycol di(meth)acrylate, a 1,6-hexaneglycol di(meth)acrylate, a trimethylolpropane tri (meth)acrylate, a pentaerythritol tetra(meth)acrylate, dipentaerythritol hexa(meth)acrylate, a 2,2-bis(4-(meth)acryloxydiethoxyphenyl)propane, a 2,2-bis(4-(meth)acryloxypolyethoxyphenyl)propane, and the like.

The ratio of the number of moles of the polyfunctional monomer (A4) with respect to the number of moles of the polymerizable compound (A) is not particularly limited as long as the objective of the present invention is not impaired. From the viewpoint of appropriately crosslinking the polymer of the polymerizable compound (A), the ratio of the number of moles of the polyfunctional monomer (A4) with respect to the number of moles of the polymerizable compound (A) is preferably 0.5 mol % or more and 20 mol % or less, more preferably 1 mol % or more and 15 mol % or less and still more preferably 1 mol % or more and 10 mol % or less.

[Other Monomer (A5)]

The polymerizable compound (A) may include other monomer (A5) other than the hydrophilic polymerizable compound (A1), the adhesive polymerizable compound (A2), the acidic polymerizable compound (A3a), the basic polymerizable compound (A3b) and the polyfunctional monomer (A4) to an extent that the objective of the present invention is not impaired. Other monomer (A5) is a compound that has an ethylenic unsaturated double bond and does not correspond to the hydrophilic polymerizable compound (A1), the adhesive polymerizable compound (A2), the acidic polymerizable compound (A3a), the basic polymerizable compound (A3b) and the polyfunctional monomer (A4). Examples of other monomer (A5) include a methyl (meth)acrylate, an ethyl (meth)acrylate, an isopropyl (meth)acrylate, an n-propyl (meth)acrylate, an n-butyl (meth)acrylate, an isobutyl (meth)acrylate, a tert-butyl (meth)acrylate, an n-pentyl (meth)acrylate, an isopentyl (meth)acrylate, a phenyl (meth)acrylate, an N-methyl (meth)acrylamide, an N-ethyl (meth)acrylamide, an N-n-propyl (meth)acrylamide, an N-isopropyl (meth)acrylamide, an N-n-butyl (meth)acrylamide, an N-n-pentyl (meth)acrylamide, an N-isopentyl (meth)acrylamide, an N-phenyl (meth)acrylamide, an N,N-dimethyl (meth)acrylamide, an N,N-diethyl (meth)acrylamide, an N,N-di-n-propyl (meth)acrylamide, an N,N-di-n-butyl (meth)acrylamide, an N,N-di-n-pentyl (meth)acrylamide, a styrene, an α-methylstyrene, a β-methylstyrene, an o-methylstyrene, a m-methylstyrene, a p-methylstyrene, a chlorostyrene, a methyldiallylamine, an ethyldiallyamine, a triallylamine, and the like.

The ratio of the number of moles of other monomer (A5) with respect to the number of moles of the polymerizable compound (A) is not particularly limited as long as the polymerizable compound (A) includes the hydrophilic polymerizable compound (A1), the adhesive polymerizable compound (A2), the acidic polymerizable compound (A3a) and the basic polymerizable compound (A3b) in a desired amount.

The ratio of the mass of the polymerizable compound (A) with respect to the mass of the hydrophilizing surface treatment liquid is not particularly limited, and is preferably 1% by mass or more and 40% by mass or less, more preferably 2% by mass or more and 20% by mass or less and still more preferably 2% by mass or more and 15% by mass or less.

<Polymerization Initiator (B)>

The hydrophilizing surface treatment liquid includes a polymerization initiator (B) as a component that polymerizes the polymerizable compound (A). The polymerization initiator (B) is not particularly limited as long as the polymerization initiator (B) is a compound capable of polymerizing the polymerizable compound (A) having an ethylenic unsaturated double bond.

Appropriate examples of the polymerization initiator (B) include an azo polymerization initiator (B1) and a peroxide (B2).

Specific examples of the azo polymerization initiator (B1) include 2,2'-azobis(2-methylpropionamidine) dihydrochloride, 2,2'-azobis[2-methyl-N-(2-hydroxyethyl)propionamide], 2,2'-azobis[2-(phenylamidino)propane] dihydrochloride, 2,2'-azobis{2-[N-4-(chlorophenyl)amidino]propane} dihydrochloride, 2,2'-azobis{2-[N-(4-hydroxyphenl)amidino]propane} dihydrochloride, 2,2'-azobis[2-(N-benzylamidino)propane] dihydrochloride, 2,2'-azobis[2-(N-allylamidino)propane] dihydrochloride, 2,2'-azobis(2-amidinopropane) dihydrochloride, 2,2'-azobis{2-[N-(2-hydroxyethyl)amidino]propane} dihydrochloride, 2,2-azobis [2-(5-methyl-2-imidazolin-2-yl)propane] dihydrochloride, 2,2-azobis[2-(2-imidazolin-2-yl)propane] dihydrochloride, 2,2-azobis[2-(4,5,6,7-tetrahydro-1H-1,3-diazepine-2-yl) propane] dihydrochloride, 2,2-azobis[2-(3,4,5,6-tetrahydropyrimidine-2-yl)propane] dihydrochloride, 2,2-azobis[2-(5-hydroxy-3,4,5,6-tetrahydropyrimidine-2-yl)propane] dihydrochloride, 2,2-azobis{2-[1-(2-hydroxyethyl)-2-imidazolin-2-yl]propane} dihydrochloride, 2,2-azobis[2-(2-imidazoli-2-yl)propane]. The azo polymerization initiator (B1) may be used singly or two or more thereof may be used in combination.

Specific examples of the peroxide (B2) include an alkyl peroxide such as isobutyl peroxide, and decanoyl peroxide; a carboxylic acid anhydride peroxide such as an acetyl peroxide; an aromatic carboxylic acid anhydride peroxide such as a benzoyl peroxide; a polycarboxylic acid peroxide such as succinic acid peroxide; a peroxy dicarbonate such as a diisopropyl peroxy dicarbonate, a di-2-ethylhexyl peroxy dicarbonate, and an diallyl peroxy dicarbonate; a peroxy ester such as tert-butyl peroxy isobutyrate, tert-butyl peroxy neodecanoate, and a cumene peroxy neodecanoate; a peroxy anhydride of a carboxy acid and a sulfonic acid such as acetyl cyclohexyl sulfonyl peroxide; an inorganic peroxide such as an ammonium persulphate, a potassium persulphate, a potassium chlorate, a potassium bromate, and a potassium superphosphate. The peroxide (B1) may be used singly or two or more thereof may be used in combination.

The amount of the polymerization initiator (B) used is not particularly limited as long as the polymerization initiator is capable of favorably initiating a polymerization reaction. The amount of the polymerization initiator (B) used is preferably 0.1 mol % or more and 20 mol % or less and more preferably 0.1 mol % or more and 15 mol % or less of the number of moles of the entire polymerizable compound (A).

From the viewpoint of the stability over time of the surface treatment liquid, the surface treatment liquid may be a two-component surface treatment liquid including a first liquid including the polymerizable compound (A) and a solvent (S) and a second liquid including the polymerization initiator (B) and a solvent (S). Such a two-component surface treatment liquid is used after the two liquids are mixed together immediately before a surface treatment.

[Solvent (S)]

The surface treatment liquid includes a solvent (S). The solvent (S) may be water, an organic solvent or an aqueous solution of an organic solvent. From the viewpoint of the solubility of the polymerizable compound (A), the safety of working for a hydrophilizing treatment, low costs and the like, the solvent (S) is preferably water. Preferable examples of the organic solvent that is used as the solvent (S) include alcohols. Examples of the alcohols include aliphatic alcohols, and alcohols having 1 or more and 3 or less carbon atoms are preferable. Specific examples thereof include methanol, ethanol, n-propyl alcohol and isopropyl alcohol (IPA), and methanol, ethanol and isopropyl alcohol are preferable. The alcohols may be used singly or two or more thereof may be used in combination.

The content of water in the solvent (S) is preferably 50% by mass or more, more preferably 80% by mass or more and particularly preferably 100% by mass.

[Other Components]

The hydrophilizing surface treatment liquid may include a variety of additive to an extent that the objective of the present invention is not impaired. Examples of such additives include an antioxidant, an ultraviolet absorber, a colorant, a defoamer, a viscosity modifier and the like. The content of these additives is appropriately determined in consideration of an amount in which these additives are ordinarily used.

<<Hydrophilizing Treatment Method>>

The hydrophilizing treatment method includes: applying the hydrophilizing surface treatment liquid to form a coating film on the surface of an object to be treated, and heating the coating film to form a coating on the surface of the object to be treated. Here, there is no need to apply the surface treatment liquid uniformly to the entire surface of the object to be treated, which is supposed to be hydrophilized, as long as the surface of the object to be treated is hydrophilized as much as desired. The hydrophilizing treatment method preferably further includes rinsing the surface of the object to be treated with a rinse liquid after the heating of the coating. Particularly, rinsing with water or an aqueous solution of an organic solvent makes it easy to remove a polymer having a low polymerization degree or crosslinking degree and having a low molecular weight from the coating.

Hereinafter, applying the surface treatment liquid to form a coating film on the surface of the object to be treated will also be referred to as the "application step". Heating the coating film to form a coating on the surface of the object to be treated will also be referred to as the "heating step". Rinsing the surface of the object to be treated with a rinse liquid after the heating of the coating will also be referred to as the "rinsing step". Hereinafter, the application step, the heating step and the rinsing step will be described in detail.

<Application Step>

In the application step, the surface treatment liquid is applied to the surface of an object to be treated to form a coating film. The application method is not particularly limited. Specific examples of the application method include a spin coating method, a spraying method, a roller coating method, an immersion method and the like. In a case where the object to be treated is a substrate, the spin coating method is preferable as the application method since it is easy to evenly form a coating having a uniform film thickness on the surface of the substrate.

The material of the surface of the object to be treated to which the surface treatment liquid is applied is not particularly limited and may be an organic material or an inorganic material. Examples of the organic material include a variety of resin materials such as a polyester resin such as a PET resin or a PBT resin, a variety of nylons, a polyimide resin, a polyamide-imide resin, a polyolefin such as polyethylene or polypropylene, polystyrene, a (meth)acrylic resin, a cycloolefin polymer (COP), a cycloolefin copolymer (COC) and a silicone resin (for example, polyorganosiloxane such as polydimethylsiloxane (PDMS)). In addition, a photosensitive resin component that is included in a variety of resist materials as well as an alkali-soluble resin component are also preferable as the organic material. Examples of the inorganic material include glass, silicon and a variety of metals such as copper, aluminum, iron and tungsten. The metals may be alloys.

The shape of the object to be treated is not particularly limited. The object to be treated may be flat or a three-dimensional shape, for example, a spherical shape or a columnar shape.

The object to be treated may be exposed to a chemical such as a washing agent, and there is a concern that the exposure to the chemical may degrade the hydrophilicity of the coating formed on the object to be treated. However, the use of the above-described surface treatment liquid makes it possible to suppress the deterioration of the hydrophilicity in a case where the surface-treated surface has come into contact with a variety of chemicals. Therefore, when an object to be treated that is often exposed to a chemical such as a washing agent, for example, a window, a mirror, furniture, a glass member provided in an optical device (for example, a device having a lens) or a translucent resin member is employed as an object to be treated, it is possible to exhibit an effect on, particularly, the chemical resistance of the hydrophilicity.

After the surface treatment liquid is applied to the surface of the object to be treated, at least part of the solvent (S) may be removed from the coating film formed of the surface treatment liquid as necessary by a well-known drying method.

The film thickness of the coating film that is formed in the application step is not particularly limited. The thickness of the coating film that is formed in the application step is, for example, preferably 1 μm or less, more preferably 300 nm or less and still more preferably 100 nm or less.

The thickness of the coating film that is formed by the application step can be adjusted by adjusting the solid content concentration of the surface treatment liquid, an application condition and the like.

<Heating Step>

In the heating step, the coating film formed in the application step is heated. The heating makes the polymerizable compound (A) that is included in the coating film polymerize due to the action of the polymerization initiator (B) to form a resin coating that strongly bonds to the surface of the object to be treated.

The heating conditions are not particularly limited as long as the polymerizable compound (A) polymerizes as much as desired and the object to be treated does not deteriorate or deform. The heating temperature is, for example, preferably 30° C. or more and 300° C. or less and more preferably 40° C. or more and 250° C. or less. The heating time is, for example, preferably one minute or more and six hours or less, more preferably three minutes or more and 60 minutes or less and still more preferably five minutes or more and 30 minutes or less.

<Rinsing Step>

In the rinsing step, the surface of the object to be treated is rinsed with a rinse liquid after the heating of the coating film. The rinsing makes it possible to reduce the thickness of the coating that is formed on the surface of the object to be treated. The rinse liquid is not particularly limited as long as a coating having a desired film thickness can be formed. As the rinse liquid, water, an organic solvent and an aqueous solution of an organic solvent can be used. As the rinse liquid, water is preferable. The method for rinsing the coating is not particularly limited. Typically, the surface of the object to be treated is rinsed by bringing the rinse liquid into contact with the coating by the same method as the above-described application method.

The film thickness of the coating after the rinsing is, for example, preferably 10 nm or less, more preferably 0.1 nm or more and 10 nm or less, still more preferably 0.1 nm or more and 8 nm or less, far still more preferably 0.5 nm or more and 5 nm or less and particularly preferably 0.5 nm or more and 3 nm or less.

The thickness of the coating can be adjusted by adjusting the solid content concentration of the surface treatment liquid, an application condition, the amount of the rinse liquid used, the type of the rinse liquid, the temperature of the rinse liquid and the like.

After the rinsing, the object to be treated is dried as necessary and then preferably used in a variety of uses.

EXAMPLES

Hereinafter, the present invention will be more specifically described by showing examples, but the scope of the present invention is not limited to these examples.

Examples 1 to 4, and Comparative Examples 1 to 4

In the examples and the comparative examples, the following A1-1 to A1-3 were used as a hydrophilic polymerizable compound (A1).

[Chem. 16]

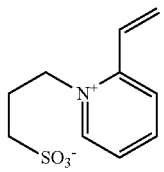
A1-1

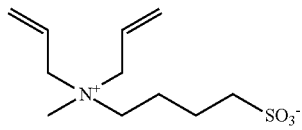
A1-2

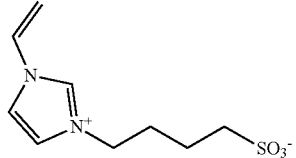
A1-3

In the examples and the comparative examples, 3-(trimethoxysilyl)propyl acrylate was used as an adhesive polymerizable compound (A2).

In the examples and the comparative examples, the following A3-1 to A3-3 were used as an acidic polymerizable compound (A3a) and a basic polymerizable compound (A3b).

A3-1: Vinylsulfonic acid
A3-2: 4-Vinylpyridine
A3-3: Diallylamine

In the examples and the comparative examples, 2,2'-azobis(2-methylpropionamidine) dihydrochloride was used in amounts shown in Table 1 as a polymerization initiator (B).

The polymerizable compound (A) was dissolved in water according to the types and amounts shown in Table 1 such that the solid content concentration reached 10% by mass, and then the polymerization initiator (B) was added to the obtained solutions in the amounts shown in Table 1, thereby obtaining surface treatment liquids of Examples 1 to 4 and Comparative Examples 1 to 4.

<pH of Aqueous Solution of Polymerizable Compound (A)>

The individual compounds used as the polymerizable compound (A) were dissolved in water such that the mole ratios became the same as the mole ratios shown in Table 1 and the concentration of the polymerizable compound (A) reached 10% by mass. The pH at 23° C. was measured using the obtained aqueous solutions. The measurement results of the pH are shown in Table 1.

<Water Contact Angle>

The surface treatment liquid of each of the examples and the comparative examples was applied onto a silicon wafer by spin coating under conditions of 1000 rpm and 60 seconds, and the wafer was heated at 100° C. for 10 minutes. Next, the surface of the wafer was washed with water to form a coating composed of a resin that was a copolymer of the polymerizable compound (A) on the wafer. A pure water drop (2.0 μL) was added dropwise to the surface-treated surface of the silicon wafer using DropMaster 700 (manufactured by Kyowa Interface Science Co., Ltd.), and the contact angle of the water was measured as a contact angle after 10 seconds from the dropwise addition. The average value of the contact angles of water at three points on the silicon wafer is shown in Table 1. The contact angle of water on the untreated silicon wafer is 13.8°.

<Chemical Solution Resistance>

A silicon wafer surface-treated by the same method as for the measurement of the water contact angle was immersed in an aqueous solution including sodium laureth sulfate at a concentration of 1% by mass, which is an anionic chemical solution, or an aqueous solution including amine-modified polydimethylsiloxane at a concentration of 1% by mass, which is a cationic chemical solution, for one minute. After that, the surface of the silicon wafer was washed with pure water by showering for one minute. The water contact angle on the surface-treated surface of the washed silicon wafer was measured according to the above-described method. The measured contact angles of water are shown in Table 1.

that does not easily deteriorate in a case where the coating comes into contact with anionic chemical solutions or cationic chemical solutions cannot be formed on the surface of an object to be treated using the hydrophilizing treatment liquid. Furthermore, according to Comparative Example 4, it is found that, even when the pH at 23° C. of the aqueous solution including the polymerizable compound (A) at a concentration of 10% by mass is within a range of 6.5 or more and 7.5 or less, if the polymerizable compound (A) does not include the hydrophilic polymerizable compound (A1), a coating having hydrophilicity that does not easily deteriorate in a case where the coating comes into contact with anionic chemical solutions or cationic chemical solutions cannot be formed on the surface of an object to be treated using the hydrophilizing treatment liquid.

TABLE 1

|  |  | Example | | | | Comparative example | | | |
| --- | --- | --- | --- | --- | --- | --- | --- | --- | --- |
|  |  | 1 | 2 | 3 | 4 | 1 | 2 | 3 | 4 |
| Hydrophilic polymerizable compound (A1) | A1-1 (mmol) | 35.90 | — | 35.90 | — | 35.90 | 18.00 | — | — |
|  | A1-2 (mmol) | — | 32.30 | — | — | — | — | — | — |
|  | A1-3 (mmol) | — | — | — | 34.70 | — | — | 34.70 | — |
| Adhesive polymerizable compound (A2) | A2-1 (mmol) | 0.37 | 0.36 | 0.37 | 0.43 | 0.37 | 0.36 | — | 0.46 |
| Acidic polymerizable compound (A3a) | A3-1 (mmol) | — | 3.23 | — | 8.25 | 0.37 | — | — | 26.6 |
| Basic polymerizable compound (A3b) | A3-2 (mmol) | 0.37 | — | — | — | — | 18.00 | 0.37 | 10.4 |
|  | A3-3 (mmol) | — | — | 0.37 | — | — | — | — | — |
| Polymerization initiator (B) (mmol) |  | 0.37 | 0.36 | 0.37 | 0.36 | 0.37 | 0.36 | 0.37 | 0.40 |
| pH of aqueous solution of polymerizaple compound (A) |  | 6.8 | 6.7 | 7.2 | 6.8 | 5.7 | 7.8 | 8.8 | 6.9 |
| Contact angle of water (°) | Initial | 5.7 | 5.1 | 6.1 | 7.5 | 6.1 | 18.1 | 7.5 | 20.5 |
|  | After anionic chemical solution treatment | 4.9 | 5.1 | 5.1 | 5.6 | 5.7 | 75.1 | 76.8 | 76.2 |
|  | After cationic chemical solution treatment | 5.1 | 5.3 | 5.2 | 5.7 | 82.1 | 20.1 | 8.1 | 78.9 |

According to the examples, it is found that, in the hydrophilizing surface treatment liquid including the polymerizable compound having an ethylenic unsaturated double bond (A), the polymerization initiator (B) and the solvent (S), when the hydrophilic polymerizable compound (A1), the adhesive polymerizable compound (A2), the acidic polymerizable compound (A3a) and/or the basic polymerizable compound (A3b) are used as the polymerizable compound (A) and the aqueous solution including the polymerizable compound (A) at a concentration of 10% by mass has a pH at 23° C. of 6.5 or more and 7.5 or less, a coating having hydrophilicity that does not easily deteriorate even in a case where the coating comes into contact with anionic chemical solutions or cationic chemical solutions can be formed on the surface of an object to be treated using the hydrophilizing treatment liquid. In contrast, according to Comparative Examples 1 to 3, it is found that, even when the hydrophilizing surface treatment liquid includes the hydrophilic polymerizable compound (A1), the adhesive polymerizable compound (A2), the acidic polymerizable compound (A3a) and/or the basic polymerizable compound (A3b) as the polymerizable compound (A), if the pH at 23° C. of the aqueous solution including the polymerizable compound (A) at a concentration of 10% by mass is outside a range of 6.5 or more and 7.5 or less, a coating having hydrophilicity

What is claimed is:

1. A hydrophilizing surface treatment liquid comprising:
   a polymerizable compound (A);
   a polymerization initiator (B); and
   a solvent(S),
   wherein the polymerizable compound (A) has an ethylenic unsaturated double bond,
   the polymerizable compound (A) comprises a hydrophilic polymerizable compound (A1), an adhesive polymerizable compound (A2), an acidic polymerizable compound (A3a) and/or a basic polymerizable compound (A3b), and
   an aqueous solution containing the polymerizable compound (A) at a concentration of 10% by mass has a pH at 23° C. of 6.5 or more and 7.5 or less, and
   a ratio of a mass of the polymerizable compound (A) with respect to a mass of the hydrophilizing surface treatment liquid is 1% by mass or more and 40% by mass or less.

2. The hydrophilizing surface treatment liquid according to claim 1, wherein the hydrophilic polymerizable compound (A1) is a polymerizable betaine compound.

3. The hydrophilizing surface treatment liquid according to claim 1, wherein the adhesive polymerizable compound (A2) has at least one adhesive group selected from the group consisting of a hydrolysable silyl group, an amino group, a carboxy group, a mercapto group, a cyano group and a hydroxyl group.

4. The hydrophilizing surface treatment liquid according to claim 1, wherein the polymerizable compound (A) comprises a compound having one or more polymerizable groups selected from a vinyl group and an allyl group.

5. The hydrophilizing surface treatment liquid according to claim 1, wherein a ratio of a number of moles of the adhesive polymerizable compound (A2) with respect to a number of moles of the polymerizable compound (A) is 0.1 mol % or more and 10 mol % or less.

6. A hydrophilizing treatment method for hydrophilizing a surface of an object to be treated, comprising:
applying the hydrophilizing surface treatment liquid according to claim 1 to form a coating film on the surface of the object to be treated; and
heating the coating film to form a coating on the surface of the object to be treated.

7. A hydrophilizing surface treatment liquid comprising:
a polymerizable compound (A);
a polymerization initiator (B); and
a solvent(S),
wherein the polymerizable compound (A) has an ethylenic unsaturated double bond,
the polymerizable compound (A) comprises a hydrophilic polymerizable compound (A1), an adhesive polymerizable compound (A2), an acidic polymerizable compound (A3a) and/or a basic polymerizable compound (A3b),
the hydrophilic polymerizable compound (A1) is a polymerizable betaine compound represented by the following formula (a1-i) or formula (a1-ii):

(a1-i)

in the formula (a1-i), $R^1$ is a hydrocarbon group having an ethylenic unsaturated double bond, $R^2$ is a divalent hydrocarbon group having 1 or more and 10 or less carbon atoms, R is an anionic group, and ring A is a heterocycle,

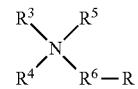
(a1-ii)

in the formula (a1-ii), $R^3$, $R^4$, and $R^5$ are each independently a hydrocarbon group having an ethylenic unsaturated double bond, or a hydrocarbon group having 1 or more and 10 or less carbon atoms, at least one of $R^3$, $R^4$, and $R^5$ is the hydrocarbon group having the ethylenic unsaturated double bond, Re is a divalent hydrocarbon group having 1 or more and 10 or less carbon atoms, and R is an anionic group, and an aqueous solution containing the polymerizable compound (A) at a concentration of 10% by mass has a pH at 23° C. of 6.5 or more and 7.5 or less.

8. The hydrophilizing surface treatment liquid according to claim 7, wherein the adhesive polymerizable compound (A2) has at least one adhesive group selected from the group consisting of a hydrolysable silyl group, an amino group, a carboxy group, a mercapto group, a cyano group and a hydroxyl group.

9. The hydrophilizing surface treatment liquid according to claim 7, wherein the polymerizable compound (A) comprises a compound having one or more polymerizable groups selected from a vinyl group and an allyl group.

10. The hydrophilizing surface treatment liquid according to claim 7, wherein a ratio of a number of moles of the adhesive polymerizable compound (A2) with respect to a number of moles of the polymerizable compound (A) is 0.1 mol % or more and 10 mol % or less.

11. A hydrophilizing treatment method for hydrophilizing a surface of an object to be treated, comprising:
applying the hydrophilizing surface treatment liquid according to claim 7 to form a coating film on the surface of the object to be treated; and
heating the coating film to form a coating on the surface of the object to be treated.

* * * * *